(12) United States Patent
Maemura et al.

(10) Patent No.: US 12,722,515 B2
(45) Date of Patent: Sep. 1, 2026

(54) WIRELESS POWER TRANSFER SYSTEM

(71) Applicant: TOYOTA JIDOSHA KABUSHIKI KAISHA, Toyota (JP)

(72) Inventors: Masato Maemura, Nisshin (JP); Toshiya Hashimoto, Miyoshi (JP); Shogo Tsuge, Fuji (JP); Ryosuke Ikemura, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 362 days.

(21) Appl. No.: 18/512,203

(22) Filed: Nov. 17, 2023

(65) Prior Publication Data

US 2024/0253504 A1 Aug. 1, 2024

(30) Foreign Application Priority Data

Jan. 31, 2023 (JP) ................................ 2023-012750

(51) Int. Cl.
*B60L 53/39* (2019.01)
*B60L 53/122* (2019.01)
(Continued)

(52) U.S. Cl.
CPC ............ *B60L 53/39* (2019.02); *B60L 53/122* (2019.02); *B60L 53/65* (2019.02); *B60L 53/66* (2019.02);
(Continued)

(58) Field of Classification Search
None
See application file for complete search history.

(56) References Cited

U.S. PATENT DOCUMENTS 9,853,459 B2 * 12/2017 Park .......................... H02J 7/47
2013/0088090 A1 * 4/2013 Wu .......................... H01F 3/08 336/84 R (Continued)

FOREIGN PATENT DOCUMENTS

CN 107852038 A * 3/2018 .............. H02J 50/80
CN 110014910 A * 7/2019 .............. H02J 7/025

(Continued)

OTHER PUBLICATIONS

Suh et al., "Electric Vehicle On-Road Dynamic Charging System with Wireless Power Transfer Technology", 2013, IEEE. (Year: 2013).*

(Continued)

*Primary Examiner* — Mohammad Ali
*Assistant Examiner* — Kelvin Booker
(74) *Attorney, Agent, or Firm* — SoraIP, Inc.

(57) ABSTRACT

In a wireless power transfer system configured to contactlessly transfer power from a supply device in a road to a vehicle, the vehicle includes a plurality of power receiving devices configured to receive power from the supply device, and a power transfer ECU is configured to set, based on state information from the vehicle, a power transfer pattern by which each of a plurality of segments transfers power, the power transfer pattern being set for each power transfer device. The power transfer ECU is configured to cause each of the power transfer devices to transfer power based on the power transfer pattern.

2 Claims, 10 Drawing Sheets

(51) Int. Cl.

| | |
|---|---|
| ***B60L 53/65*** | (2019.01) |
| ***B60L 53/66*** | (2019.01) |
| ***H02J 50/12*** | (2016.01) |
| ***H02J 50/50*** | (2016.01) |
| ***H02J 50/80*** | (2016.01) |

(52) U.S. Cl.

CPC ............ *H02J 50/12* (2016.02); *H02J 50/502* (2020.01); *H02J 50/80* (2016.02)

(56) References Cited

U.S. PATENT DOCUMENTS

| | | | | |
|---|---|---|---|---|
| 2014/0375267 | A1* | 12/2014 | Oishi | B60L 3/04 320/109 |
| 2015/0298559 | A1* | 10/2015 | Keeling | H02J 50/12 320/108 |
| 2015/0303714 | A1* | 10/2015 | Keeling | B60L 53/66 320/108 |
| 2016/0023557 | A1* | 1/2016 | Dimke | B60L 53/36 320/108 |
| 2016/0068070 | A1* | 3/2016 | Huang | H02J 50/12 320/108 |
| 2016/0190814 | A1* | 6/2016 | Budhia | H01F 38/14 307/104 |
| 2016/0190815 | A1* | 6/2016 | Keeling | H02J 50/12 307/104 |
| 2016/0218534 | A1* | 7/2016 | Islinger | H01F 38/14 |
| 2017/0326992 | A1* | 11/2017 | Budhia | H02J 50/10 |
| 2017/0346348 | A1* | 11/2017 | Lethellier | H02J 7/00034 |
| 2017/0368944 | A1* | 12/2017 | Huang | B60L 53/65 |
| 2018/0178666 | A1* | 6/2018 | Javaid | H02J 50/90 |
| 2022/0032778 | A1 | 2/2022 | Kanezaki et al. | |

FOREIGN PATENT DOCUMENTS

| | | | | | |
|---|---|---|---|---|---|
| CN | 209921075 | U | * | 1/2020 | H02J 7/025 |
| DE | 112009003536 | B4 | * | 11/2014 | G07C 5/0808 |
| DE | 102024101290 | A1 | * | 8/2024 | B60L 53/66 |
| EP | 3872520 | A2 | * | 9/2021 | G01S 13/765 |
| JP | 2020-178471 | A | | 10/2020 | |
| JP | 2024108535 | A | * | 8/2024 | B60L 53/66 |
| KR | 20250019868 | A | * | 2/2025 | B60L 53/60 |
| WO | WO-2019227213 | A1 | * | 12/2019 | H02J 50/70 |

OTHER PUBLICATIONS

Rahulkumar et al., "An Empirical Survey on Wireless Inductive Power Pad and Resonant Magnetic Field Coupling for In-Motion EV Charging System", Dec. 2022, IEEE Access. (Year: 2022).*

Song et al., "A Review of Dynamic Wireless Power Transfer for In-Motion Electric Vehicles", Oct. 2015, IntechOpen. (Year: 2015).*

Wang et al., "A Novel Magnetic Coupling Mechanism for Dynamic Wireless Charging System for Electric Vehicles", Jan. 2018, IEEE Transactions on Vehicular Technology, vol. 67, No. 1. (Year: 2018).*

Hutchinson et al., "Potential of wireless power transfer for dynamic charging of electric vehicles", Dec. 2017, IET Intell. Transp. Syst., 2019, vol. 13 Iss. 1, pp. 3-12. (Year: 2017).*

Kadem et al., "Optimal Coupler Topology for Dynamic Wireless Power Transfer for Electric Vehicle", May 2021, Energies 2021, 14, 3983. (Year: 2021).*

Azad, A.N., "Energy Management of Dynamic Wireless Power Transfer Systems for Electric Vehicle Applications", 2019, Utah State University. (Year: 2019).*

Azad et al., "Analysis, Optimization, and Demonstration of a Vehicular Detection System Intended for Dynamic Wireless Charging Applications", Mar. 2019, IEEE Transactions on Transportation Electrification, vol. 5, No. 1. (Year: 2019).*

Alam, M.M., "A Dynamic Wireless Electric Vehicle Charging System With Uniform Coupling Factor and Negligible Power Transfer Fluctuation", 2018, Faculty of Engineering University of Malaya Kuala Lumpur. (Year: 2018).*

* cited by examiner 1
2
3
4
5
6
7
8
10
11
20
21

FIG. 8

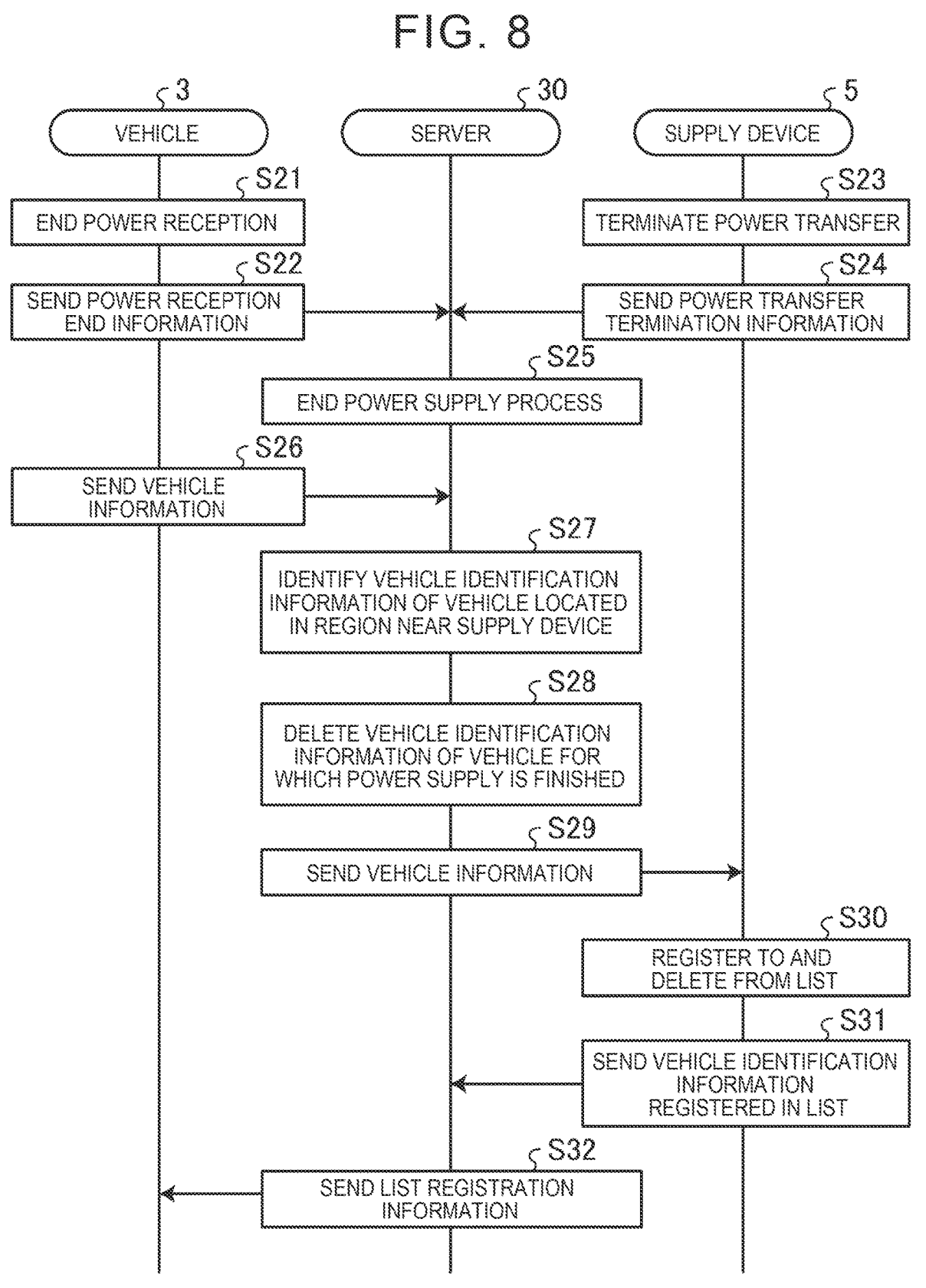

3 VEHICLE
30 SERVER
5 SUPPLY DEVICE
S21 END POWER RECEPTION
S23 TERMINATE POWER TRANSFER
S22 SEND POWER RECEPTION END INFORMATION
S24 SEND POWER TRANSFER TERMINATION INFORMATION
S25 END POWER SUPPLY PROCESS
S26 SEND VEHICLE INFORMATION
S27 IDENTIFY VEHICLE IDENTIFICATION INFORMATION OF VEHICLE LOCATED IN REGION NEAR SUPPLY DEVICE
S28 DELETE VEHICLE IDENTIFICATION INFORMATION OF VEHICLE FOR WHICH POWER SUPPLY IS FINISHED
S29 SEND VEHICLE INFORMATION
S30 REGISTER TO AND DELETE FROM LIST
S31 SEND VEHICLE IDENTIFICATION INFORMATION REGISTERED IN LIST
S32 SEND LIST REGISTRATION INFORMATION

FIG. 11

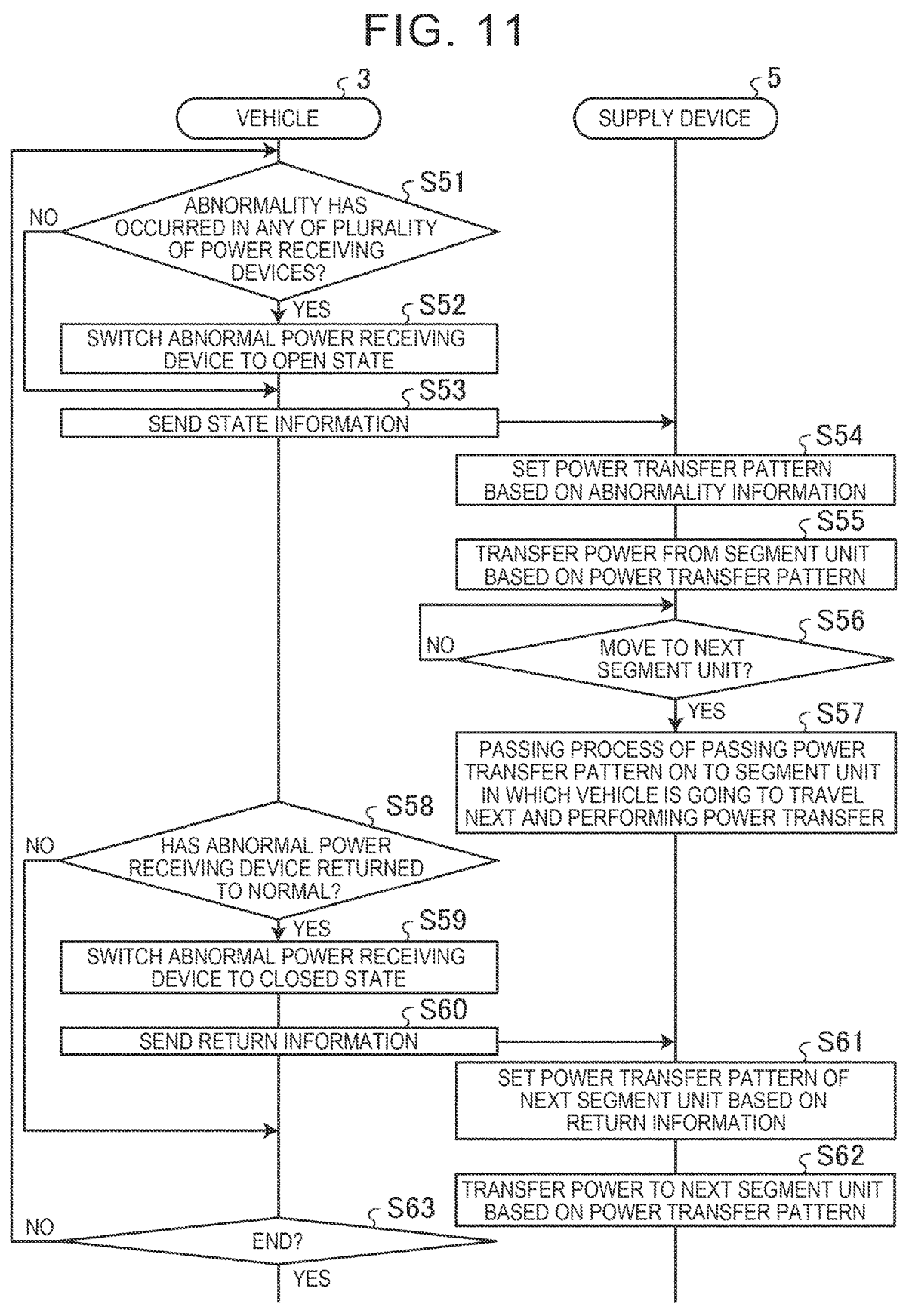

3 VEHICLE

5 SUPPLY DEVICE

S51 ABNORMALITY HAS OCCURRED IN ANY OF PLURALITY OF POWER RECEIVING DEVICES?

NO

YES

S52 SWITCH ABNORMAL POWER RECEIVING DEVICE TO OPEN STATE

S53 SEND STATE INFORMATION

S54 SET POWER TRANSFER PATTERN BASED ON ABNORMALITY INFORMATION

S55 TRANSFER POWER FROM SEGMENT UNIT BASED ON POWER TRANSFER PATTERN

S56 MOVE TO NEXT SEGMENT UNIT?

NO

YES

S57 PASSING PROCESS OF PASSING POWER TRANSFER PATTERN ON TO SEGMENT UNIT IN WHICH VEHICLE IS GOING TO TRAVEL NEXT AND PERFORMING POWER TRANSFER

S58 HAS ABNORMAL POWER RECEIVING DEVICE RETURNED TO NORMAL?

NO

YES

S59 SWITCH ABNORMAL POWER RECEIVING DEVICE TO CLOSED STATE

S60 SEND RETURN INFORMATION

S61 SET POWER TRANSFER PATTERN OF NEXT SEGMENT UNIT BASED ON RETURN INFORMATION

S62 TRANSFER POWER TO NEXT SEGMENT UNIT BASED ON POWER TRANSFER PATTERN

S63 END?

NO

YES

WIRELESS POWER TRANSFER SYSTEM

CROSS-REFERENCE TO RELATED APPLICATION

This application claims priority to Japanese Patent Application No. 2023-012750 filed on Jan. 31, 2023, incorporated herein by reference in its entirety.

BACKGROUND

1. Technical Field

The present disclosure relates to wireless power transfer systems.

2. Description of Related Art

Japanese Unexamined Patent Application Publication No. 2020-178471 (JP 2020-178471 A) describes a technique in which, when power is supplied from any of a plurality of power supply segments to a vehicle, electrical characteristics of the power supply segment involved in the power supply are acquired, and whether an abnormality has occurred in this power supply segment is determined using the acquired electrical characteristics. In this technique, whether any of the electrical characteristics of a target segment has an abnormal value is determined by comparing the electrical characteristics of the target segment with the electrical characteristics of either of both of the segments located before and after the target segment. The target segment is a segment for which whether an abnormality has occurred is to be determined.

SUMMARY

In a wireless power transfer system, it is conceivable to provide a plurality of power receiving circuits in a vehicle.

However, JP 2020-178471 A does not consider at all how to deal with when an abnormality occurs in any of the power receiving circuits of the vehicle, and has room for improvement.

The present disclosure was made in view of the above circumstances, and it is an object of the present disclosure to provide a wireless power transfer system that can deal with appropriately even when an abnormality occurs in any of a plurality of power receiving devices of a vehicle.

In order to solve the above problem and achieve the above object, a wireless power transfer system according to the present disclosure is

- a wireless power transfer system configured to contactlessly transfer power from a supply device in a road to a vehicle.

The vehicle includes

- a plurality of power receiving devices configured to receive power from the supply device, and
- a communication device configured to send state information indicating states of the power receiving devices to outside.

The supply device includes

- a plurality of power transfer devices each including a segment unit composed of a plurality of segments configured to transfer power, and
- a processor.

The processor is configured to set, based on the state information, a power transfer pattern by which each of the segments transfers power, the power transfer pattern being set for each of the power transfer devices, and is configured to cause each of the power transfer devices to transfer power based on the power transfer pattern.

According to the present disclosure, it is possible to deal with appropriately even when an abnormality occurs in any of the power receiving devices of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a sequence diagram illustrating an operation after the power supply from the supply device to the vehicle is completed during traveling;

FIG. 11 is a sequential diagram illustrating an operation using a P2PS between vehicles and supply devices in performing power transfer.

DETAILED DESCRIPTION OF EMBODIMENTS

Hereinafter, a wireless power transfer system according to an embodiment of the present disclosure will be described in detail. The present disclosure is not limited to the embodiments described below.

Configuration of Wireless Power Transfer System

Figure 1:
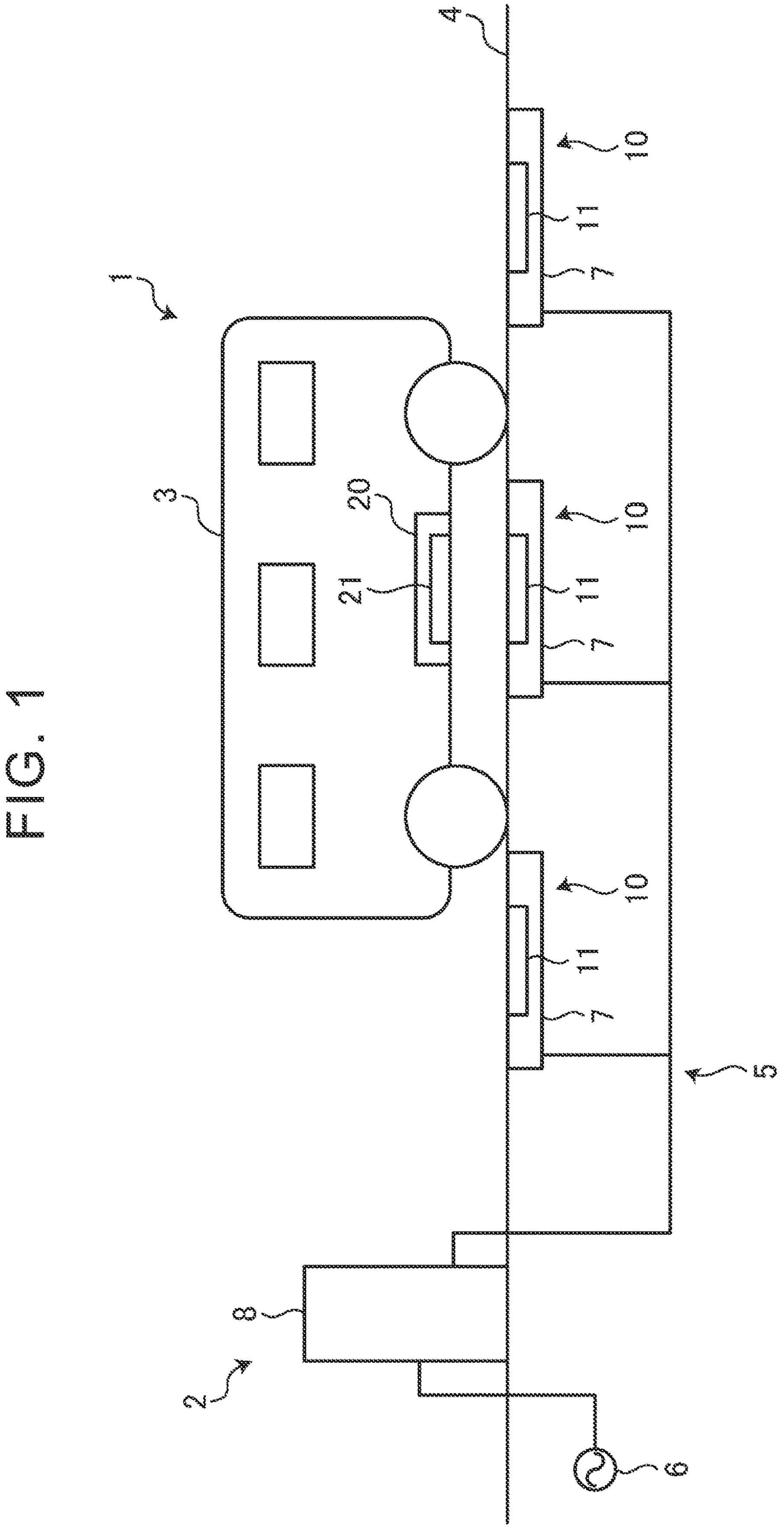
FIG. 1 is a schematic diagram illustrating a wireless power transfer system according to an embodiment.

FIG. 1 is a schematic diagram illustrating a wireless power transfer system according to an embodiment. Wireless Power Transfer System 1 comprises a supply facility 2 and a vehicle 3. The supply facility 2 is a facility that contactlessly supplies power to the vehicle 3 that is traveling. The vehicle 3 is an electrified vehicle capable of charging electric power supplied from an external power source, and is, for example, a large-sized vehicle such as a bus or a truck of battery electric vehicle (BEV) or plug-in hybrid electric vehicle (PHEV).

The wireless power transfer system 1 performs wireless power transfer from the supply facility 2 to the vehicle 3 by magnetic field resonance coupling (magnetic field resonance). The wireless power transfer system 1 contactlessly transfers power from the supply facility 2 to the vehicle 3 traveling on the road 4. That is, the wireless power transfer system 1 transfers power by a magnetic field resonance method, and realizes power supply during traveling to the vehicle 3 by using magnetic field resonance coupling (magnetic field resonance). The wireless power transfer system 1 may be represented as a dynamic wireless power transfer (D-WPT) system or a magnetic field dynamic wireless power transfer (MF-D-WPT) system.

Configuration of Supply Device

The supply facility 2 includes a supply device 5 and an AC power supply 6 that supplies power to the supply device 5. The supply device 5 contactlessly transfers power supplied from the AC power supply 6 to the vehicle 3. The AC power supply 6 is, for example, a commercial power supply. The supply device 5 includes a power transfer device 10 having a primary coil 11.

The supply device 5 comprises a segment 7 comprising a primary coil 11 and a management device 8 for managing the segment 7. The segment 7 is embedded in the lane of the road 4. The management device 8 is installed beside the road 4. The segment 7 is electrically connected to the management device 8. The management device 8 is electrically connected to the AC power supply 6, and supplies the power of the AC power supply 6 to the segment 7. The segment 7 is electrically connected to the AC power supply 6 via the management device 8. A plurality of segments 7 can be arranged along the lane of the road 4. For example, as shown in FIG. 1, the supply device 5 includes three segments 7 arranged side by side along a lane in the road 4, and one management device 8 to which three segments 7 are connected. The segment 7 has a function to contactlessly transfer power from the supply device 5 to the vehicle 3. The management device 8 has a function of controlling wireless power transfer in the segment 7.

Configuration of the Vehicle

The vehicle 3 includes a power receiving device 20 having a secondary coil 21. The power receiving device 20 is provided at the bottom of the vehicle body of the vehicle 3. When the vehicle 3 travels on the road 4 on which the primary coil 11 is installed, the primary coil 11 on the ground side and the secondary coil 21 on the vehicle side face each other in the up-down direction. In the wireless power transfer system 1, power is contactlessly transferred from the primary coil 11 of the power transfer device 10 to the secondary coil 21 of the power receiving device 20 while the vehicle 3 is traveling on the road 4.

In this description, the term "traveling" means a state in which the vehicle 3 is located on the road 4 for traveling. During traveling, a state in which the vehicle 3 is temporarily stopped on the road 4 is also included. For example, during traveling, a state in which the vehicle 3 is stopped on the road 4 due to waiting for a signal or the like is also included during traveling. On the other hand, even in a state where the vehicle 3 is located on the road 4, for example, when the vehicle 3 is parked and stopped, the vehicle is not included during traveling.

In this description, a lane in which the primary coil 11 (segment 7) is embedded is referred to as a D-WPT lane, and a portion of the road 4 where wireless power transfer by the supply device 5 is possible is sometimes referred to as a D-WPT charge site. In D-WPT lane and D-WPT charge site, a plurality of primary coils 11 (a plurality of segments 7) are arranged side by side in the traveling direction of the vehicle 3 over a predetermined section of the road 4.

Overall Configuration of the Wireless Power Transfer System

Figure 2:
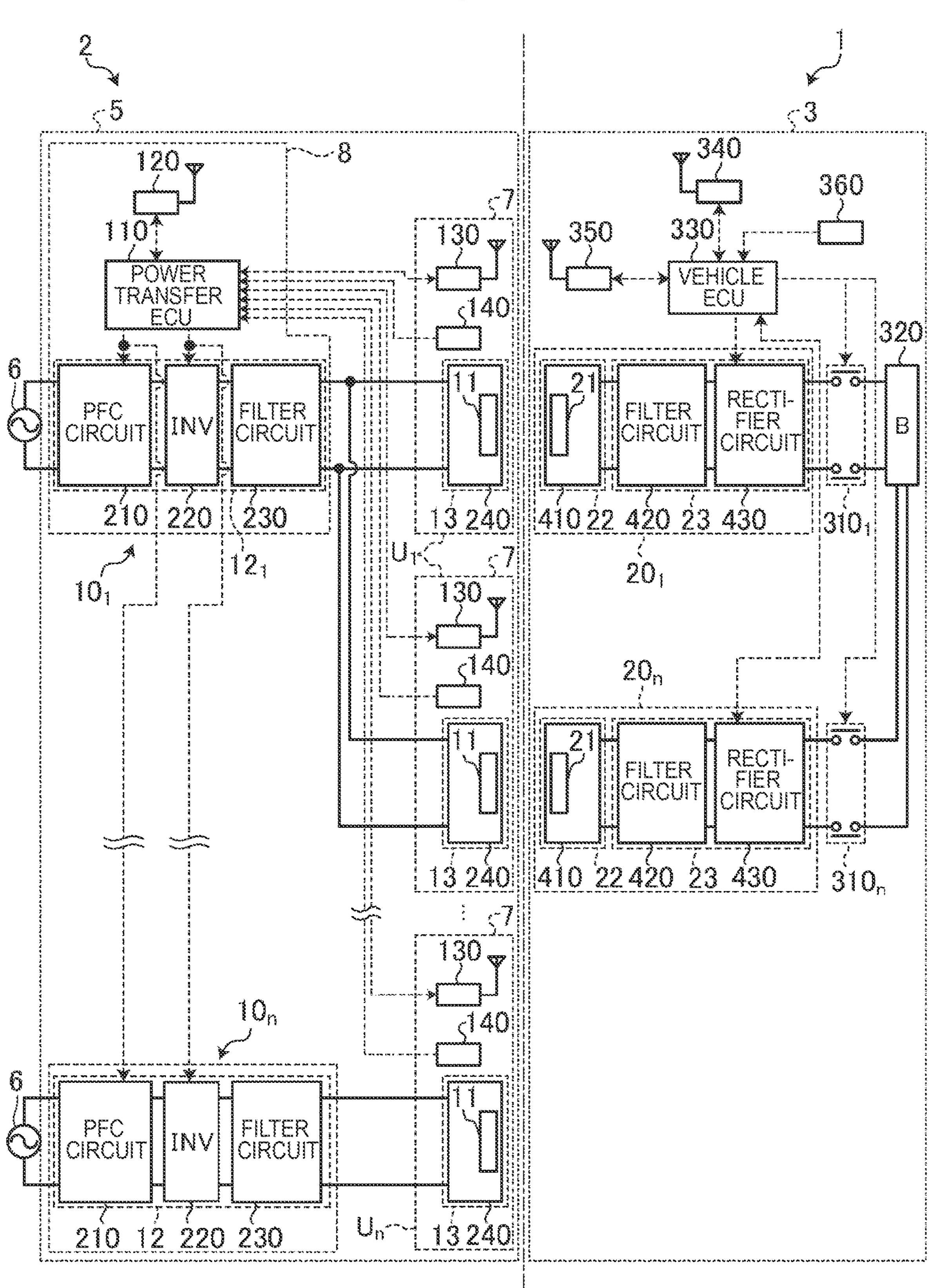
FIG. 2 is a diagram illustrating an overall configuration of a wireless power transfer system.

FIG. 2 is a diagram illustrating an overall configuration of the wireless power transfer system 1. The wireless power transfer system 1 illustrated in FIG. 2 includes a supply facility 2 and a vehicle 3.

Functional Configuration of the Supply Device

In the supply facility 2, the supply device 5 and the AC power supply 6 are electrically connected to each other. In the supply device 5, the segment 7 and the management device 8 are electrically connected. The supply device 5 includes a configuration provided in the management device 8 and a plurality of segment units $U_1$ to $U_n$ each composed of a plurality of segments 7 (n=an integer of 2 or more). Moreover, the supply device 5 includes a plurality of power transfer devices $\mathbf{10}_1$ to $\mathbf{10}_n$ (n=an integer of 2 or more), a power transfer electronic control unit (ECU) 110, a first communication device 120, a second communication device 130, and a foreign object detection device 140. In the following description, any one of power transfer devices $\mathbf{10}_1$ to $\mathbf{10}_n$ is simply referred to as power transfer device 10. Furthermore, the power transfer devices $\mathbf{10}_1$ to $\mathbf{10}_n$ have the same configuration. Therefore, in the following, the configuration of one power transfer device 10 will be described for simplicity of description.

The power transfer device 10 includes an electric circuit connected to the AC power supply 6. The power transfer device 10 includes a Power Factor Collection (PFC) circuit 210, an inverter (INV) 220, a filter circuit 230, and a power transfer-side resonance circuit 240.

PFC circuitry 210 improves the power factor of the AC power inputted from the AC power supply 6, converts the AC power into DC power, and outputs the DC power to the inverter 220. PFC circuitry 210 includes AC/DC converters. PFC circuitry 210 is electrically connected to the AC power supply 6.

The inverter 220 converts the DC power inputted from PFC circuitry 210 into AC power. The switching elements of the inverter 220 are constituted by Insulated Gate Bipolar Transistor (IGBT), Metal-Oxide-Semiconductor Field Effect Transistor (MOSFET), and the like, and perform a switching operation in response to a control signal from a power transfer ECU 110. For example, the drive frequency of the inverter 220 is 85 kHz. The inverter 220 outputs the converted AC power to the filter circuit 230.

The filter circuit 230 removes noise included in the alternating current input from the inverter 220, and supplies the AC power from which the noise has been removed to the power transfer-side resonance circuit 240. The filter circuit 230 is a LC filter that combines a coil and a capacitor. For example, the filter circuit 230 includes a T-type filter in which two coils and one capacitor are arranged in a T-shape. PFC circuit 210, the inverter 220, and the filter circuit 230 constitute the power conversion unit 12 of the power transfer device 10.

The power transfer-side resonance circuit 240 is a power transfer unit that contactlessly transfers the AC power supplied from the filter circuit 230 to the power receiving device 20. When AC power is supplied from the filter circuit 230 to the power transfer-side resonance circuit 240, a current flows through the primary coil 11, and a magnetic field for power transfer is generated.

The power transfer-side resonance circuit 240 includes a primary coil 11 and a resonance capacitor. The primary coil 11 is a power transfer coil. The resonant capacitor is connected in series to one end of the primary coil 11, and adjusts the resonant frequency of the power transfer-side resonance circuit. The resonant frequency is from 10 kHz to 100 GHz, preferably 85 kHz. For example, the power transfer device 10 is configured such that the resonance frequency of the power transfer-side resonance circuit 240 matches the drive frequency of the inverter 220. The power transfer-side resonance circuit 240 constitutes the primary device 13 of the power transfer device 10.

The power transfer device 10 includes a power conversion unit 12 and a primary device 13. The power conversion unit 12 includes a PFC circuit 210, an inverter 220, and a filter circuit 230. The primary device 13 includes a power transfer-side resonance circuit 240. The power transfer device 10 has a configuration in which the power conversion unit 12 is provided in the management device 8 and the primary device 13 is provided in the segment 7. That is, the power transfer device 10 includes a plurality of segment units $U_1$ to $U_n$ each composed of a plurality of segments 7 (n=an integer of 2 or more). When any one of the segment units $U_1$ to the segment unit $U_n$ is referred to, it is simply referred to as a segment unit U. Furthermore, the segment units $U_1$ to $U_n$ each have the same configuration. Each of the power transfer devices $\mathbf{10}_1$ to $\mathbf{10}_n$ includes a segment unit U.

In the supply device 5, the power conversion unit 12, the power transfer ECU 110, and the first communication device 120 of the power transfer device 10 are provided in the management device 8, and the primary device 13, the second communication device 130, and the foreign object detection device 140 of the power transfer device 10 are provided in the segments 7.

The power transfer ECU 110 is an electronic control unit that controls the supply device 5. The power transfer ECU 110 includes a processor and a memory. The processor consists of Central Processing Unit (CPU), Digital Signal Processor (DSP), Field-Programmable Gate Array (FPGA), etc. The memories are main storage devices, and are composed of Random Access Memory (RAM), Read Only Memory (ROM), and the like. The power transfer ECU 110 loads a program stored in the storage unit into a working area of a memory (main storage device) and executes the program, and controls the respective constituent units and the like through executing the program, thereby realizing a function that matches a predetermined objective. The storage unit includes a recording medium such as an Erasable Programmable ROM (EPROM), Hard Disk Drive (HDD), and a removable medium. Examples of the removable medium include disc recording media such as Universal Serial Bus (USB) memories, Compact Disc (CD), Digital Versatile Disc (DVD), Blu-ray (registered trademark) Disc (BD). The storage unit can store an operating system Operating System (OS), various programs, various tables, various databases, and the like. Signals from various sensors are inputted to the power transfer ECU 110. A signal from the foreign object detection device 140 is inputted to the power transfer ECU 110. The power transfer ECU 110 performs various types of control based on signals inputted from various types of sensors.

For example, the power transfer ECU 110 performs power control for adjusting power to be transferred. In the power control, the power transfer ECU 110 controls the power transfer device 10. The power transfer ECU 110 outputs a control signal to the power conversion unit 12 to control the power supplied from the power conversion unit 12 to the primary device 13. The power transfer ECU 110 controls the switching elements included in the PFC circuit 210 to adjust the power to be transferred, and controls the switching elements included in the inverter 220 to adjust the power to be transferred.

The power transfer ECU 110 executes communication control for controlling communication with the vehicle 3. In the communication control, the power transfer ECU 110 controls the first communication device 120 and the second communication device 130.

Further, the power transfer ECU 110 sets, for each power transfer device 10, a power transfer pattern by which each of the segments 7 transfer power based on the state information received from the vehicle 3 or the server 30, and transfer power to each of the power transfer devices 10 based on the power transfer pattern. The power transfer ECU 110 passes the power transfer pattern of the segment unit U1 in which the vehicle 3 is currently traveling on to the segment unit U2 in which the vehicle 3 is going to travel next, and causes the power transfer device 10 to transfer power. The power transfer ECU 110 sets a power transfer pattern for stopping power transfer to the abnormal power receiving device 20 to the segment unit U1. Moreover, when the power transfer ECU 110 receives the return information from the vehicle 3, it changes the power transfer pattern based on the return information. When abnormal magnetic coupling occurs in any power receiving device 20 during the magnetic coupling check on the power receiving devices $\mathbf{20}_1$ to $\mathbf{20}_n$ and the power transfer device 10, the power transfer ECU 110 sets, in the segment unit U in which the vehicle 3 is going to travel next, a power transfer pattern for stopping the power transfer to the power receiving device 20 with the abnormal magnetic coupling.

The first communication device 120 is a terrestrial communication device that performs wide area wireless communication. The first communication device 120 wirelessly communicates with the vehicle 3 that has not approached WPT lane out of the vehicles 3 traveling on the road 4. The condition prior to approaching WPT lanes means that the vehicle 3 is in a position where narrow-area radio communication with the supply device 5 cannot be performed.

Wide area wireless communication is communication with a communication distance of 10 meters to 10 kilometers. Wide-area wireless communication is communication having a longer communication distance than narrow-area wireless communication. As the wide-area wireless communication, various types of wireless communication having a long communication distance can be used. For example, communication compliant with a communication standard such as 3GPP (registered trademark) and 4G, LTE, 5G, WiMAX developed by IEEE is used for wide-area radio communication. In the wireless power transfer system 1, vehicle information associated with vehicle identification information (vehicle ID) is sent from the vehicle 3 to the supply device 5 using wide area wireless communication.

The second communication device 130 is a terrestrial communication device that performs narrow-area wireless communication. The second communication device 130 performs radio communication with the vehicle 3 approaching or entering WPT lane out of the vehicles 3 traveling on the road 4. The term "approaching WPT lane" means that the vehicle 3 is in a position capable of performing narrow-area radio communication with the supply device 5.

Narrow-area wireless communication is communication with a communication distance of less than 10 meters. The narrow-area wireless communication is a communication having a shorter communication distance than the wide-area wireless communication. As the narrow-range wireless communication, various short-range wireless communication with a short communication distance can be used. For example, communication conforming to any communication standard established by IEEE, ISO, IEC or the like is used for narrow-area radio communication. As an example, Wi-Fi (registered trademark), Bluetooth (registered trademark) and ZigBee (registered trademark) are used for narrow area wireless communication. Alternatively, Radio Frequency Identification (RFID), Dedicated Short Range Communication (DSRC), or the like may be used as a technique for performing narrow-area radio communication. In the wireless power transfer system 1, vehicle identification information etc. is sent from the vehicle 3 to the supply device 5 by using narrow-area wireless communication.

The foreign object detection device 140 detects a metal foreign matter, a living body, or the like existing above the primary coil 11. The foreign object detection device 140 includes, for example, a sensor coil or an imaging device installed on the ground. The foreign object detection device 140 is used to perform Foreign Object Detection (FOD) and Living Object Protection (LOP) in the wireless power transfer system 1.

In the supply device 5, the configuration of the power transfer device 10 is divided into segments 7 and a management device 8, and three segments 7 are connected to one management device 8. The power transfer device 10 is configured such that one inverter supplies power to the three power transfer-side resonance circuits 240. Further, in the supply device 5, a signal from each segment 7 is input to the management device 8. Signals from the second communication device 130 and the foreign object detection device 140 provided in the first segment are inputted to the power transfer ECU 110. Similarly, signals from the second communication device 130 and the foreign object detection device 140 provided in the second segment are inputted to the power transfer ECU 110. Signals from the second communication device 130 and the foreign object detection device 140 provided in the third segment are inputted to the power transfer ECU 110. The power transfer ECU 110 can grasp the state of each segment 7 on the basis of the signals inputted from each segment 7.

Functional Configuration of the Vehicle

Next, a functional configuration of the vehicle 3 will be described. As illustrated in FIG. 2, the vehicle 3 includes power receiving devices $\mathbf{20}_1$ to $\mathbf{20}_n$ (n=an integer of 2 or more), charging relays $\mathbf{310}_1$ to $\mathbf{310}_n$ (n=an integer of 2 or more), a battery 320, a vehicle ECU 330, a third communication device 340, a fourth communication device 350, and a Global Positioning System (GPS) receiver 360. Hereinafter, any one of the power receiving devices $\mathbf{20}_n$ from the power receiving device $\mathbf{20}_1$ is simply referred to as a power receiving device 20.

The power receiving device 20 supplies the electric power received from the power transfer device 10 to the battery 320. The power receiving device 20 is electrically connected to the battery 320 via the charging relay 310. The power receiving device 20 includes a power reception-side resonance circuit 410, a filter circuit 420, and a rectifier circuit 430.

The power reception-side resonance circuit 410 is a power receiving unit that receives power contactlessly transferred from the power transfer device 10. The power reception-side resonance circuit 410 includes a power reception-side resonance circuit including a secondary coil 21 and a resonance capacitor. The secondary coil 21 is a power receiving coil that receives power contactlessly transferred from the primary coil 11. The resonance capacitor is connected in series to one end of the secondary coil 21, and adjusts the resonance frequency of the power reception-side resonance circuit. The resonance frequency of the power reception-side resonance circuit 410 is determined to coincide with the resonance frequency of the power transfer-side resonance circuit 240.

The resonance frequency of the power reception-side resonance circuit 410 is the same as the resonance frequency of the power transfer-side resonance circuit 240. Therefore, when a magnetic field is generated by the power transfer-side resonance circuit 240 in a state where the power reception-side resonance circuit 410 faces the power transfer-side resonance circuit 240, the vibration of the magnetic field is transmitted to the power reception-side resonance circuit 410. As a result, the primary coil 11 and the secondary coil 21 are brought into a resonance state. When an induced current flows through the secondary coil 21 by electromagnetic induction, an induced electromotive force is generated in the power reception-side resonance circuit 410. The power reception-side resonance circuit 410 receives the power contactlessly transferred from the power transfer-side resonance circuit 240 as described above. The power reception-side resonance circuit 410 supplies the power received from the power transfer-side resonance circuit 240 to the filter circuit 420. The power reception-side resonance circuit 410 constitutes the secondary device 22 of the power receiving device 20.

The filter circuit 420 removes noise included in the alternating current input from the power reception-side resonance circuit 410, and outputs the AC power from which the noise is removed to the rectifier circuit 430. The filter circuit 420 is a LC filter that combines a coil and a capacitor. For example, the filter circuit 420 includes a T-type filter in which two coils and one capacitor are arranged in a T-shape.

The rectifier circuit 430 converts the AC power input from the filter circuit 420 into DC power and outputs the DC power to the battery 320. The rectifier circuit 430 is constituted by, for example, a full-bridge circuit in which four diodes are connected in a full-bridge manner as rectifier elements. A switching element is connected in parallel to each diode of the rectifier circuit 430. The switching elements of the rectifier circuit 430 are made of IGBT and perform a switching operation in response to a control signal from ECU 330. The rectifier circuit 430 supplies the converted DC power to the battery 320. The filter circuit 420 and the rectifier circuit 430 constitute the power conversion unit 23 of the power receiving device 20.

The power receiving device 20 includes a secondary device 22 and a power conversion unit 23. The secondary device 22 includes a power reception-side resonance circuit 410. The power conversion unit 23 includes a filter circuit 420 and a rectifier circuit 430.

The charging relay 310 is provided between the rectifier circuit 430 and the battery 320. The open and close states of the charging relay 310 are controlled by the vehicle ECU 330. When the battery 320 is charged by the power transfer device 10, the charging relay 310 is controlled to be in a closed state. When the charging relay 310 is in the closed state, the rectifier circuit 430 and the battery 320 are electrically connected to each other. When the charging relay 310 is in the open state, the rectifier circuit 430 and the battery 320 are disconnected from each other. For example, when the charging relay 310 is in the open state, the vehicle 3 does not make a power supply request.

The battery 320 is a DC power source capable of being charged, and is constituted by, for example, a lithium ion battery, a nickel metal hydride battery, or the like. The battery 320 stores electric power supplied from the power transfer device 10 to the power receiving device 20. Further, the battery 320 can supply electric power to the traveling motor of the vehicle 3. The battery 320 is electrically connected to the traveling motor via a Power Control Unit (PCU). PCU is a power converter that converts the DC power of the battery 320 into AC power and supplies the AC power to the traveling motor. The switching elements of PCU are constituted by IGBT, and perform a switching operation in response to control signals from ECU 330 and the like.

The vehicle ECU 330 is an electronic control unit that controls the vehicle 3. The vehicle ECU 330 is configured in the same manner as the power transfer ECU 110 as the hardware configuration. Signals from various sensors mounted on the vehicle 3 are inputted to the vehicle ECU 330. In addition, the positioning signal received by GPS receiver 360 is inputted to the vehicle ECU 330. The vehicle ECU 330 can acquire the current position information of the vehicle 3 from the GPS receiver 360. The vehicle ECU 330 performs various types of control based on signals inputted from various types of sensors.

For example, the vehicle ECU 330 performs contactless charge control in which power is contactlessly transferred from the primary coil 11 to the secondary coil 21, and the power received by the secondary coil 21 is stored in the battery 320. In the contactless charging control, the vehicle ECU 330 controls the rectifier circuit 430, the charging relay 310, the third communication device 340, and the fourth communication device 350. The contactless charging control includes power control for controlling charging power and communication control for controlling communication with the supply device 5. In the power control, the vehicle ECU 330 controls the switching elements included in the rectifier circuit 430 to adjust the electric power (charging electric power) supplied from the power receiving device 20 to the battery 320. In the communication control, the vehicle ECU 330 controls the third communication device 340 and the fourth communication device 350.

The third communication device 340 is a communication device on the vehicle side that performs wide area wireless communication. The third communication device 340 performs radio communication with the first communication device 120 of the supply device 5 in a condition in which the vehicle 3 traveling on the road 4 are not approaching the WPT lane. Wide-area wireless communication is bidirectional wireless communication. Communication between the first communication device 120 and the third communication device 340 is performed by high-speed wireless communication.

The fourth communication device 350 is a communication device on the vehicle side that performs narrow-area wireless communication. The fourth communication device 350 performs radio communication with the second communication device 130 of the supply device 5 while the vehicle 3 is approaching or entering WPT lane. Narrow-area wireless communication is unidirectional wireless signaling. One-way radio signaling is Point to point signaling (P2PS). P2PS is used to notify the vehicle identity from the vehicle 3 to the supply device 5 in the activities of pairing, alignment check, magnetic coupling check, termination of power transfer, termination of power transfer. P2PS can also be used as Alignment check for lateral alignment. The lateral direction is a width direction of the lane, and is a width direction of the vehicle 3. The vehicle 3A is provided with fourth communication devices 350$_1$ to 350$_n$ corresponding to the power receiving devices 20$_1$ to 20$_n$. The vehicle 3 is provided with the charging relays 310 to 310 corresponding to the plurality of power receiving devices 20$_1$ to 20$_n$.

The GPS receiver 360 detects the current position of the vehicle 3 based on the positioning information obtained from the plurality of positioning satellites. The current position information of the vehicle 3 detected by GPS receiver 360 is sent to the vehicle ECU 330.

Note that the supply device 5 may include the filter circuit 230 in the management device 8 instead of the segment 7. That is, the filter circuit 230 may be installed beside the road 4. The power conversion unit 12 includes a PFC circuit 210, an inverter 220, and a filter circuit 230, and the primary device 13 includes a power transfer-side resonance circuit 240.

Further, the filter circuit 230 may be provided individually for the primary coils 11 or may be provided collectively for the plurality of primary coils 11.

The filter circuit 230 is not limited to a T-type filter, and may be, for example, a band-pass filter in which a coil and a capacitor are connected in series. The same applies to the filter circuit 420 of the vehicle 3.

Further, in the power transfer device 10, a changeover switch that switches the primary coil 11 to be energized when the inverter 220 is connected to the plurality of primary coils 11 may be provided in each of the primary devices 13. The changeover switch may be provided in the management device 8 beside the road 4 or may be provided in the vicinity of the primary coil 11.

Further, the power transfer-side resonance circuit 240 is not limited to a configuration in which the primary coil 11 and the resonance capacitor are connected in series. The primary coil 11 and the resonance capacitor may be connected in parallel or may be a combination of parallel and series. In short, the power transfer-side resonance circuit 240 only needs to be configured such that the resonance frequency of the power transfer-side resonance circuit 240 coincides with the drive frequency of the inverter 220, and the connection relationship of the constituent elements is not particularly limited. The same applies to the power reception-side resonance circuit 410 of the vehicle 3.

The drive frequency of the inverter 220 is not limited to 85 kHz, and may be a frequency in the vicinity of 85 kHz. In short, the drive frequency of the inverter 220 may be a predetermined frequency band including 85 kHz.

In addition, the power transfer device 10 may have a configuration in which a plurality of inverters 220 is connected to an output-side power line (DC power line) of PFC circuitry 210.

Further, the foreign object detection device 140 may be provided not only on the ground side but also on the vehicle 3 side. For example, when the foreign object detection device on the vehicle 3 side detects a foreign matter, a living body, or the like existing above the primary coil 11, the power supply request can be stopped until the vehicle 3 passes through the primary coil 11.

In the wireless power transfer system 1, the information sent from the vehicle 3 to the supply device 5 using the narrow-area wireless communication includes a power supply request, a power supply power request value, and the like in addition to the vehicle identification information. The power supply request is information indicating that power transfer from the primary coil 11 is requested. The supply power request value is a request value of the amount of power to be transferred from the supply device 5 to the vehicle 3. The vehicle ECU 330 can calculate the power supply demand based on SOC of the battery 320.

The wireless power transfer system 1 is not limited to a method of supplying power from the ground to the vehicle 3, and can also realize a method of supplying power from the vehicle 3 to the ground. In this case, the rectifier circuit 430 can be replaced with an inverter to realize power supply and rectification at the time of power reception.

Overview of Wide Area Wireless Communication

Figure 3:
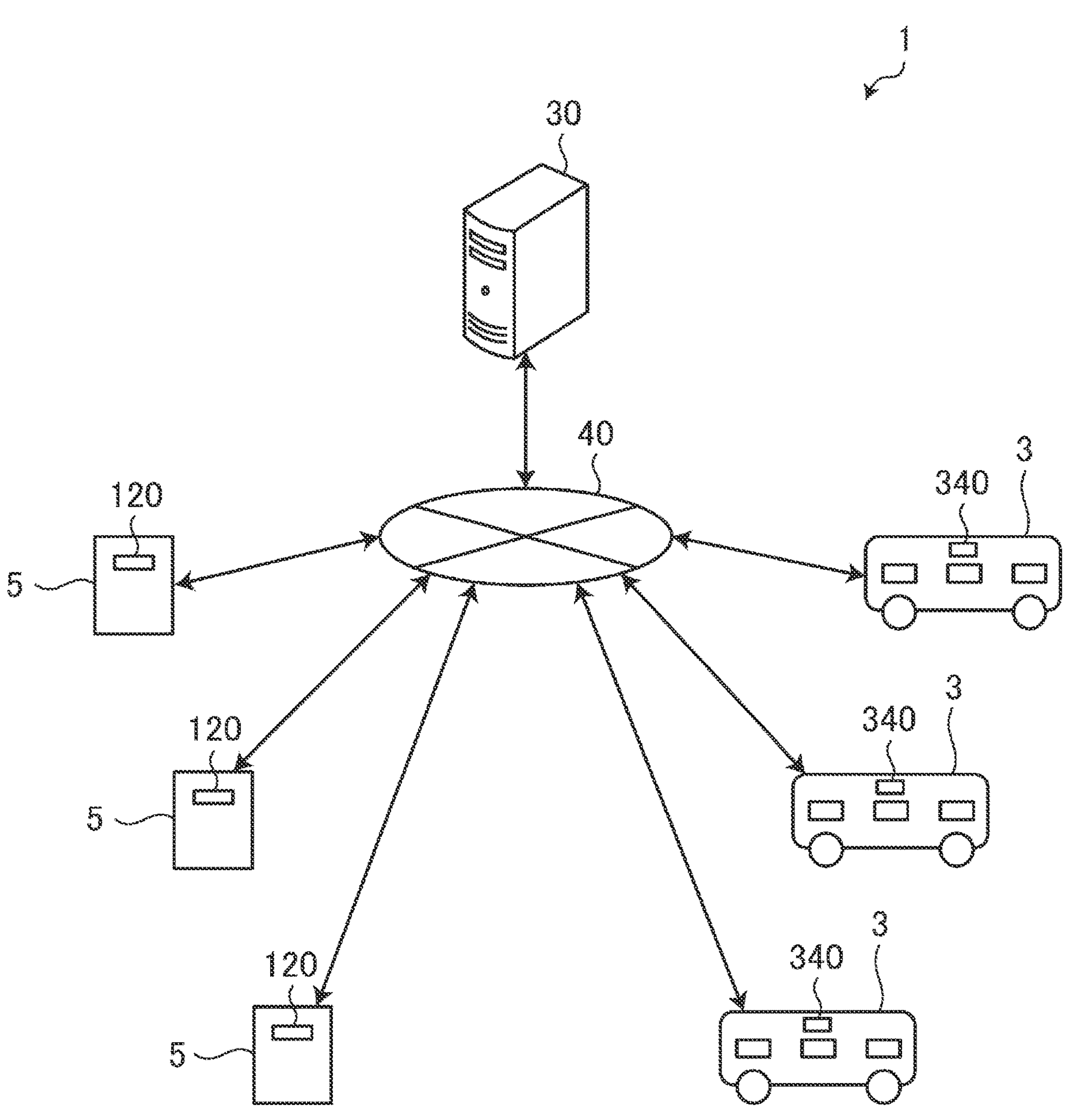
FIG. 3 is a schematic diagram for describing wide area wireless communication in a wireless power transfer system.

FIG. 3 is a schematic diagram for explaining wide-area wireless communication in the wireless power transfer system.

In the wireless power transfer system 1, the vehicle 3 can communicate with the server 30, and the supply device 5 can communicate with the server 30. The server 30 is connected to the network 40 and is capable of communicating with the plurality of vehicles 3 and the plurality of supply devices 5 via the network 40. The network 40 includes a Wide Area Network (WAN) that is a public communication network such as the Internet, a telephone communication network of a mobile telephone, and the like.

The vehicle 3 is connected to the network 40 by wide area wireless communication using the third communication device 340. The vehicle 3 sends information to the server 30 and receives information from the server 30.

The supply device 5 is connected to the network 40 by wide area wireless communication using the first communication device 120. The supply device 5 sends information to the server 30 and receives information from the server 30.

Functional Configuration of Power Transfer ECU

Figure 4:
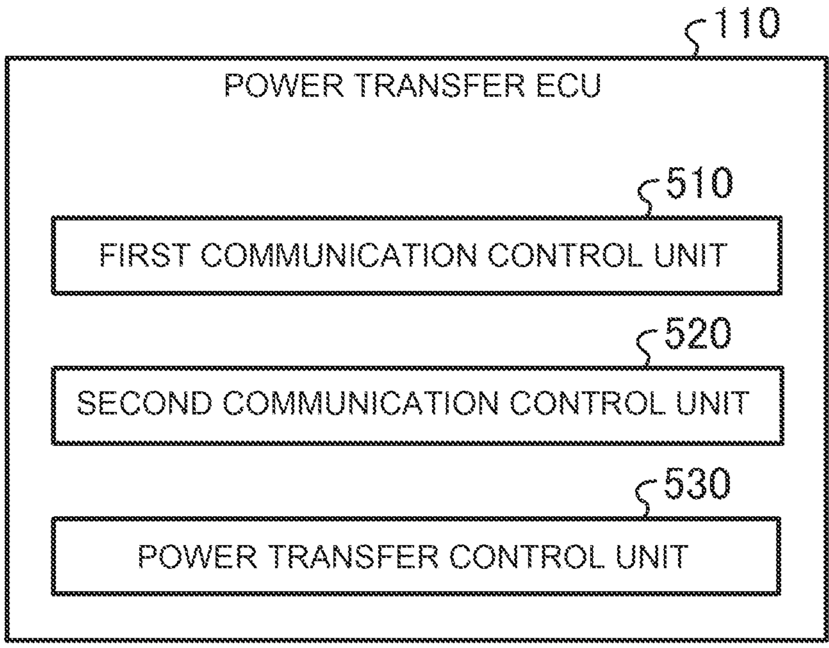
FIG. 4 is a diagram for explaining a functional configuration of a power transfer ECU.

FIG. 4 is a diagram illustrating a functional configuration of the power transfer ECU. The power transfer ECU 110 includes a first communication control unit 510, a second communication control unit 520, and a power transfer control unit 530.

The first communication control unit 510 executes first communication control for controlling the first communication device 120. The first communication control controls wide area wireless communication on the supply device 5 side, and controls communication of the supply device 5 using the first communication device 120. That is, the first communication control controls the communication of the management device 8 among the supply devices 5. The first communication control controls communication between the supply device 5 and the network 40, and controls communication between the supply device 5 and the server 30 via the network 40. The first communication control unit 510 is a Supply Equipment Communication Controller (SECC).

The second communication control unit 520 executes second communication control for controlling the second communication device 130. The second communication control controls the narrow-area wireless communication on the supply device 5 side, and controls the communication of the supply device 5 using the second communication device 130. That is, the second communication control controls the communication of the segment 7 of the supply device 5. The second communication control controls communication between the supply device 5 and the vehicle 3 as communication not through the network 40. The second communication control unit 520 is a Primary Device Communication Controller (PDCC).

The power transfer control unit 530 executes power transfer control for controlling the power transfer device 10. The power transfer control controls the power to be transferred, and controls the power conversion unit 12 of the power transfer device 10. The power transfer control unit 530 executes power control for controlling PFC circuitry 210 and the inverter 220.

Functional Configuration of the Vehicle ECU

Figure 5:
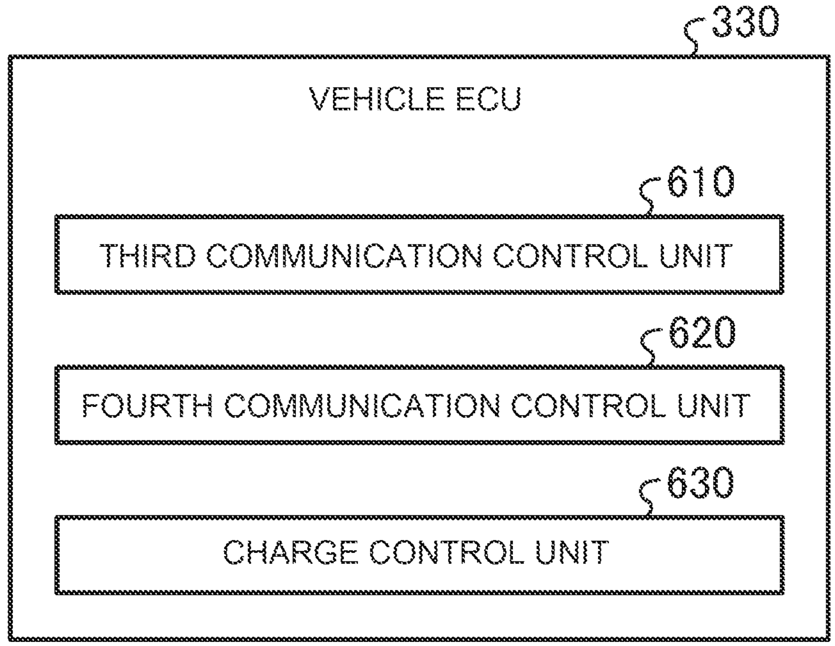
FIG. 5 is a diagram for explaining a functional configuration of a vehicle ECU.

FIG. 5 is a diagram illustrating a functional configuration of a vehicle ECU. The vehicle ECU 330 includes a third communication control unit 610, a fourth communication control unit 620, and a charge control unit 630.

The third communication control unit 610 executes third communication control for controlling the third communication device 340. The third communication control controls wide area wireless communication on the vehicle 3 side, and controls communication of the vehicle 3 using the third communication device 340. The third communication control controls communication between the vehicle 3 and the network 40, and controls communication between the vehicle 3 and the server 30 via the network 40. The third communication control unit 610 is an EV Communication Controller (EVCC).

The fourth communication control unit 620 executes fourth communication control for controlling the fourth communication device 350. The fourth communication control controls the narrow-area wireless communication on the vehicle 3 side, and controls the communication of the vehicle 3 using the fourth communication device 350. The fourth communication control controls communication between the vehicle 3 and the supply device 5 as communication not through the network 40. The fourth communication control unit 620 is a Secondary Device Communication Controller (SDCC).

The charge control unit 630 executes charging control for controlling the power receiving device 20 and the charging relay 310. The charging control includes power control for controlling the received power in the secondary device 22 and relay control for controlling the connection state between the secondary device 22 and the battery 320. The charge control unit 630 executes power control for controlling the rectifier circuit 430. The charge control unit 630 executes relay control for switching the open/close state of the charging relay 310.

In the wireless power transfer system 1 configured as described above, wireless power transfer from the supply device 5 to the vehicle 3 is performed with wireless communication between the vehicle 3 and the supply device 5 being established. In a state in which the vehicle 3 and the supply device 5 are paired by wireless communication, power is contactlessly transferred from the primary coil 11 on the ground to the secondary coil 21 of the vehicle. In the vehicle 3, charge control is performed to supply the electric power received by the secondary coil 21 to the battery 320.

Overview of Power Transfer Process

Next, referring to FIG. 6, a power transfer process (D-WPT process) will be described. A power transfer process is a process that is structured as a chain of activities and is derived from states and corresponding transitions.

Figure 6:
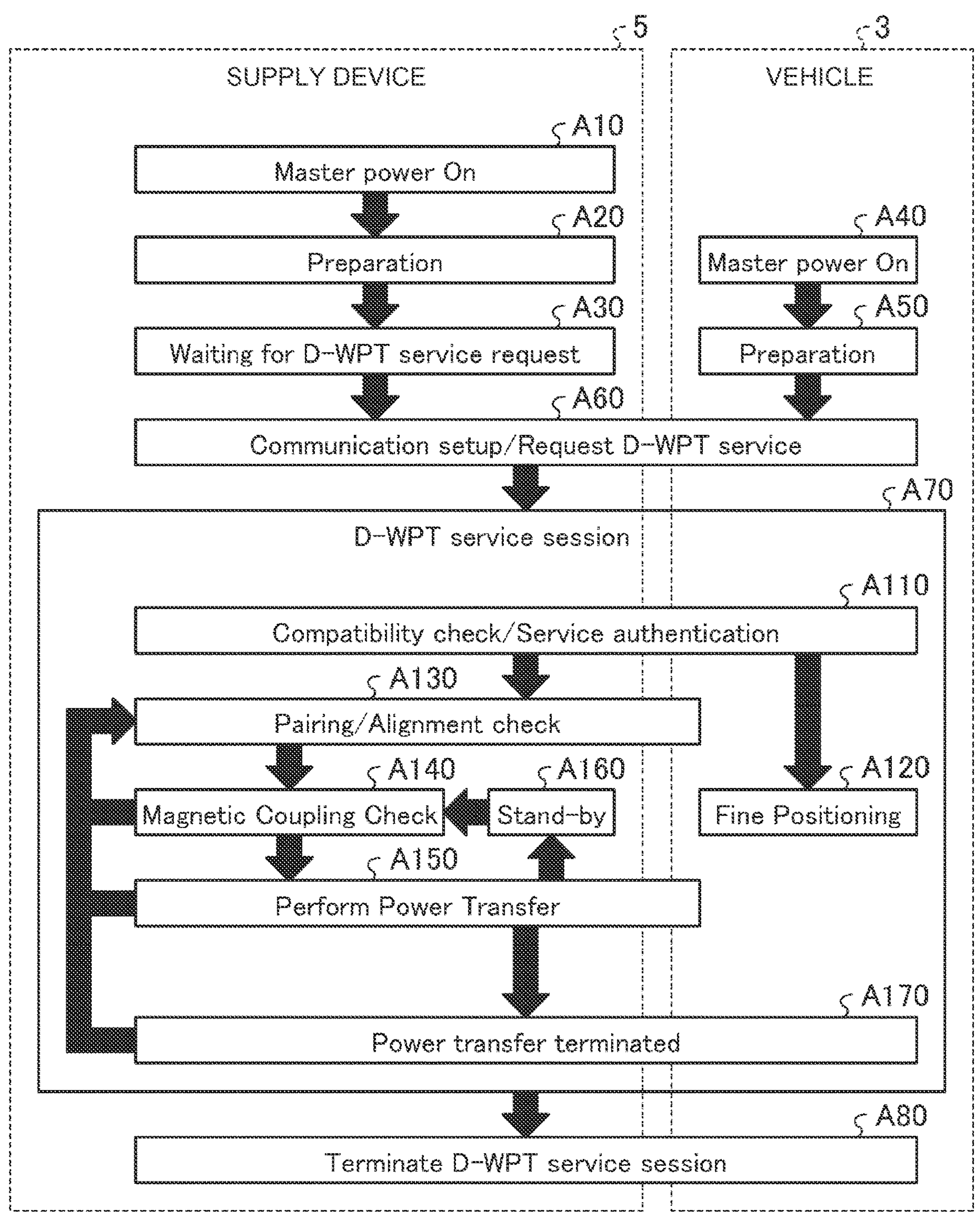
FIG. 6 is a diagram for describing a power transfer process.

FIG. 6 is a diagram for explaining a power transfer process. In FIG. 6, basic activities for describing the power transfer process are shown. The thick arrows shown in FIG. 6 represent transition lines. The state of the wireless power transfer system 1 in the power transfer process is represented by activities constituting the power transfer process.

The activity constituting the power transfer process includes a power transfer service session (D-WPT service session A70), which is an activity of performing power transfer, an activity of a stage prior to performing power transfer, and an activity of a stage after performing power transfer. In addition, the activity can be described separately depending on whether there is communication between the supply device 5 and the vehicle 3. The activity is divided into a state representing the state of only the supply device 5 side without communication, a state representing only the vehicle 3 side without communication, and a state representing both the supply device 5 with communication and the vehicle 3.

As shown in FIG. 6, the activities include Master power On A10, Preparation A20, waiting for a request from the vehicle 3 (Waiting for D-WPT service request) A30, Master power On A40, Preparation A50, Communication setup and Request D-WPT service A60, D-WPT service session A70, and Terminate D-WPT service session A80.

Preparation A20 is the preparation of the supply device 5. In Preparation A20, the supply device 5 performs the activation and the safety check of the circuitry without communicating with the vehicle 3. The supply device 5 transitions to the state of Preparation A20 after Master power On A10. Then, in Preparing A20, when the supply device 5 starts the circuit and confirms the safety, the state of the power transfer process transitions to waiting for a request from the vehicle 3 (Waiting for D-WPT service request) A30. On the other hand, when there is a problem with the supply device 5, the supply device 5 notifies the vehicle 3 of information (unavailability notification) indicating that the wireless power transfer system 1 is unavailable by wide area wireless communication. The first communication device 120 sends an unavailability notification to the vehicle 3.

Preparation A50 is a preparation condition of the vehicle 3. In Preparation A50, the vehicle 3 carries out the activation and safety checks of the circuitry without communication with the supply device 5. The vehicle 3 transitions to the state of Preparation A50 after Master power On A40. Then, when the vehicle 3 activates the circuit and safety is checked in Preparation A50 to confirm safety, the state of the power transfer process transitions to Communication setup and Request D-WPT service A60. On the other hand, when the vehicle 3 is problematic, the vehicle 3 does not initiate wide area radio communication and does not perform subsequent sequencing in D-WPT process.

Figure 7:
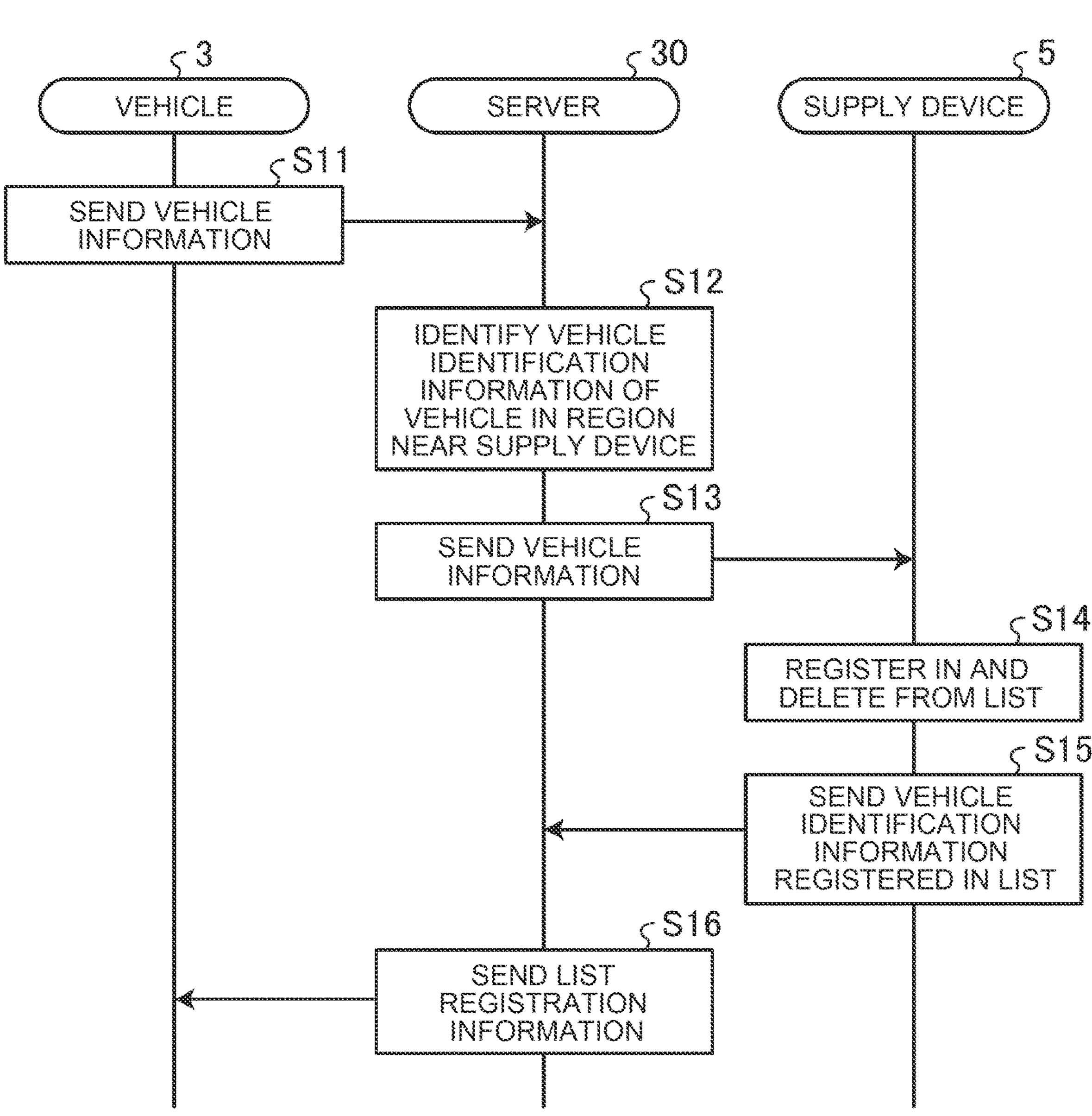
FIG. 7 is a sequence diagram illustrating a case where communication using wide area wireless communication is performed between a vehicle and a supply device.

Communication setup and Request D-WPT service A60 is initiated by the vehicle ECU 330. In Communication setup and Request D-WPT service A60, the vehicle ECU 330 initiates wide area radio communication. First, the third communication device 340 sends a request signal of D-WPT service when the vehicle 3 transitions from Preparation A50 to Communication setup and Request D-WPT service A60. The third communication device 340 wirelessly communicates with the first communication device 120 corresponding to the D-WPT lane that the vehicle 3 is going to enter or has entered. The first communication device 120 that is the communication target is selected based on the relative positional relation between the current position of the vehicle 3 and the position of D-WPT lane. When the first communication device 120 receives the request signal of D-WPT service in the state of waiting for a request from the vehicle 3 A30, the state of the power transfer process transitions to Communication setup and Request D-WPT service A60 in the supply device 5. Various types of information of wide area radio communication and P2PS communication are linked by using vehicle-identification information. FIG. 7 shows a process sequence of Communication setup and Request D-WPT service A60.

FIG. 7 is a sequence diagram illustrating a case where communication using wide area wireless communication is performed between the vehicle 3 and the supply device 5.

The vehicle 3 sends the vehicle information to the server 30 (S11). In S11, the third communication device 340 of the vehicle 3 sends the vehicle information to the server 30. The vehicle information includes vehicle identification information, various parameters of the power receiving device 20, current position information of the vehicle 3, and required power. The vehicle ECU 330 calculates the required power based on State Of Charge (SOC) of the battery 320). In S11, the vehicle ECU 330 sends the vehicle information from the third communication device 340 at predetermined intervals. The predetermined period of time is set according to the distance from the current position of the vehicle 3 to the start point of WPT lane. The shorter the distance from the vehicle 3 to the start point of the WPT lane, the shorter the distance between the predetermined times.

Upon receiving the vehicle information from the vehicle 3, the server 30 identifies the vehicle identification information of the vehicle 3 located in the vicinity area of the supply device 5 based on the current position information of the vehicle 3 included in the vehicle information (S12). In S12, the server 30 identifies the vehicle 3 located in the predetermined neighborhood area from the supply device 5 based on the current position information of the vehicle 3 and the position information of the supply device 5. The neighborhood region is set to, for example, a region within 500 meters.

When the vehicle identification information of the vehicle 3 is identified, the server 30 sends the vehicle information to the supply device 5 (S13). In S13, the transmitting device of the server 30 sends the vehicle information to the supply device 5.

Upon receiving the vehicle information from the server 30, the supply device 5 registers and deletes the vehicle identification information in the identification information list (S14). In S14, the power transfer ECU 110 registers and deletes the vehicle identification information in the identification information list so that the vehicle identification information associated with the vehicle information is registered in the identification information list without excess or deficiency.

When the vehicle identification information is registered and deleted in the identification information list, the supply device 5 sends the vehicle identification information registered in the identification information list to the server 30 (S15). In S15, the first communication device 120 of the supply device 5 sends the vehicle identification information to the server 30.

When receiving the vehicle identification information from the supply device 5, the server 30 sends a list registration notification to the vehicle 3 corresponding to the vehicle identification information registered in the identification information list (S16). In S16, the communication device of the server 30 sends a list-registration notification to the vehicle 3. The list registration notification is a notification indicating that the vehicle identification information is registered in the identification information list, and includes identification information of the supply device 5 and position information of the supply device 5.

In this way, when the vehicle 3 starts wide area wireless communication and both the supply device 5 and the vehicle 3 go into the state of Communication setup and Request D-WPT service A60, the communication setting by the wide area wireless communication succeeds. When the communication setting is successful, the state transitions to D-WPT service session A70.

Return to FIG. 6. D-WPT service session A70 contactlessly transfers power from the power transfer-side resonance circuit 240 of the supply device 5 to the power reception-side resonance circuit 410 of the vehicle 3 with communication connection being established between the supply device 5 and the vehicle 3. D-WPT service-session A70 begins with successful communication setup and ends upon termination of communication. In the state of D-WPT service session A70, when the communication is terminated, the state transitions to Terminate D-WPT service session A80.

In Terminate D-WPT service session A80, the vehicle 3 terminates the wide area radio communication with the supply device 5. The vehicle 3 and the supply device 5 may receive a trigger to terminate D-WPT service session A70. Then, the vehicle ECU 330 prevents D-WPT from being started for the secondary device 22 and the vehicle 3 until the third communication device 340 receives the subsequent notification (requesting D-WPT service).

More Information About D-WPT Service Session A70

Detailed activities of D-WPT service session A70 will now be described.

D-WPT service session A70 includes Compatibility check and Service authentication A110, Fine Positioning A120, Pairing and Alignment check A130, Magnetic Coupling Check A140, Perform Power Transfer A150, Stand-by A160, and Power transfer terminated A170.

Compatibility check and Service authentication A110 will be described. After the communication setup is successful, the vehicle ECU 330 and the power transfer ECU 110 confirm that the primary device 13 and the secondary device 22 are compatible. Compatibility check is performed on the supply device 5 side based on information associated with the vehicle identification information acquired by communication. Examples of the check items include the lowest ground level of the secondary device 22, the shape type of the secondary device 22, the circuit topology of the secondary device 22, the self-resonance frequency of the secondary device 22, and the number of the secondary coils 21.

In Compatibility check and Service authentication A110, first, the vehicle 3 sends compatibility Information of the power receiving device 20 from the third communication device 340 to the supply device 5. The first communication device 120 of the supply device 5 receives the compatibility information of the power receiving device 20 from the vehicle 3. Then, the first communication device 120 of the supply device 5 sends the compatibility information of the power transfer device 10 to the vehicle 3. The third communication device 340 of the vehicle 3 receives the compatibility information of the power transfer device 10 from the supply device 5.

Elements of the compatibility information sent from the vehicle 3 to the supply device 5 include vehicle identification information, WPT Power Classes, Air Gap Class, WPT Operating Frequencies, WPT frequency adjustment, WPT Type, WPT Circuit Topology, Fine Positioning Method, Pairing Method, Alignment Method, and information on the presence or absence of a power adjustment function.

Elements of the compatibility information sent from the supply device 5 to the vehicle 3 include supply device identification information, WPT power classes, gap class, WPT driving frequencies, WPT frequency adjustment, WPT type, WPT circuit topology, fine positioning method, pairing method, alignment method, and information on the presence or absence of a power adjustment function.

Each element name will be described in detail. In the following description, each element of the compatibility information sent from the vehicle 3 to the supply device 5 will be described, and description of the compatibility information that overlaps with the compatibility information sent from the vehicle 3 to the supply device 5 out of the compatibility information sent from the supply device 5 to the vehicle 3 will be omitted.

The gap class is information indicating a gap class that can be received by the secondary device 22. WPT power class indicates a power class that can be received by the secondary device 22. WPT drive frequency indicates the frequency of the received power received by the secondary device 22. WPT frequency adjustment is information indicating whether or not the drive frequency can be adjusted. WPT type is information indicating the shape type of the secondary device 22, and indicates the coil shape of the secondary coil 21. Examples of WTP types include circles and solenoids. WPT circuit topology is an example of a configuration in which the secondary coil 21 is connected to the resonant capacitor. WTP topologies include series and parallel. The detailed alignment method is information indicating how to perform the alignment when performing the alignment. The pairing method is a method in which the vehicle 3 performs pairing for identifying the supply device 5. The alignment method is a method of checking the relative positions of the secondary device 22 and the primary device 13 before the start of power transfer.

Fine Positioning A120 will be described. The vehicle 3 performs Fine Positioning A120 prior to or in parallel with Pairing and Alignment check A130. When the vehicle ECU 330 determines that the vehicle 3 has approached or entered the installed area (WPT lane) of the supply device 5, it starts Fine Positioning A120.

The vehicle ECU 330 guides the vehicle 3 to align the primary device 13 and the secondary device 22 within the limits of establishing adequate magnetic coupling for wireless power transfer.

Fine Positioning A120 is basically performed manually or automatically on the vehicle 3 side. Fine Positioning A120 can cooperate with an automated driving assistance (ADAS).

The activities of Fine Positioning A120 may then continue until the vehicle 3 leaves D-WPT charge site or the state changes to communication termination, and may be performed based on the alignment information sent from the supply device 5 to the vehicle 3 by the wide area radio communication. This communication termination is Terminate D-WPT service session A80.

Pairing and Alignment check A130 will be described. Here, Pairing and Alignment check will be described separately.

First, the pairing will be described. P2PS interface performing the narrow-area radio communication ensures that the primary device 13 and the secondary device 22 are uniquely paired. The pairing state process is as follows.

First, the vehicle ECU 330 recognizes that the vehicle 3 has approached or entered D-WPT lane. For example, the vehicle ECU 330 has map information including D-WPT lanes, and recognizes approaching or entering by the straight line distance or the like as compared with the position information of the vehicle obtained by the GPS receiver 360. The vehicle 3 sends to the server 30 by wide area radio communication which D-WPT lanes are approached. In short, the third communication device 340 notifies the cloud of an indication that the vehicle 3 is approaching any one of D-WPT lanes. Further, when the vehicle ECU 330 recognizes that the vehicle 3 approaches or enters D-WPT lane, the fourth communication device 350 starts sending the modulated signal at regular intervals for pairing between the primary device 13 and the secondary device 22.

The supply device 5 may recognize that the vehicle 3 has approached or entered the D-WPT lane by using the information acquired from the server 30 by the wide area radio communication. The server 30 allocates the vehicle identification information of the vehicles 3 approaching in each D-WPT lane to the supply devices 5 corresponding to the lanes. Since the supply device 5 only needs to refer to the vehicle identification information whose number is narrowed by the server 30, the authentication process can be performed in a short time. When the supply device 5 recognizes that the vehicles 3 are approaching the D-WPT lanes, the second communication device 130 enters the standby mode. In the standby mode, the reception of the modulated signal from the fourth communication device 350 of the vehicle 3 is awaited. The modulated signal includes vehicle identification information.

When the second communication device 130 receives the modulated signal from the vehicle 3, the supply device 5 compares the vehicle identification information received by the narrow-area wireless communication with the vehicle identification information in the identification information list obtained by the wide-area wireless communication with the plurality of vehicles 3 coming toward D-WPT lanes. By this comparison, the supply device 5 identifies the vehicle 3.

When the vehicle ECU 330 recognizes that the vehicle 3 is outside D-WPT lane, it stops sending the modulated signal from the fourth communication device 350. The vehicle ECU 330 can determine whether or not the vehicle has passed through D-WPT lanes based on the map information and the position information of the vehicle.

When determining that the vehicle 3 is not traveling in D-WPT lane or that the vehicle 3 is not approaching D-WPT lane, the supply device 5 stops the standby of the modulated signal from the fourth communication device 350.

Pairing is performed on the primary device 13 until the vehicles 3 exit D-WPT charge site or the state changes to communication termination. When Pairing is complete, the state transitions to Alignment check.

Next, Alignment check will be described. Alignment check is intended to ensure that the lateral distance between the primary device 13 and the secondary device 22 is within an acceptable range. Alignment check is performed using narrow-area radio communication (P2PS).

Alignment check is performed continuously based on P2PS until the vehicles 3 leave D-WPT charge site or the state changes to communication termination. The alignment check result may be sent from the first communication device 120 to the third communication device 340 by wide area wireless communication.

Magnetic Coupling Check A140 will be described. In Magnetic Coupling Check A140, the supply device 5 checks the magnetic coupling condition and confirms that the secondary device 22 is within the allowable range. When Magnetic Coupling Check A140 ends, the state transitions to Perform Power Transfer A150.

Perform Power Transfer A150 will be described. In this state, the supply device 5 performs power transfer to the power receiving device 20. The power transfer device 10 and the power receiving device 20 need to be provided with the capability to control the power to be transferred (transfer power and reception power) in order to protect the power receiving device 20 and the battery 320 with the usefulness of MF-D-WPT. Larger power transfer helps to increase the travel distance of the power receiving device 20 without static wireless charging and conductive charging. However, the capacity of the battery 320 varies depending on the vehicle type of the vehicle 3, and the demand for driving power may rapidly fluctuate. The sudden fluctuation includes a sudden regenerative brake. When regenerative braking is performed while traveling in D-WPT lane, since the regenerative braking is prioritized, the power received from the power receiving device 20 in addition to the regenerative power is supplied to the battery 320. In this case, in order to protect the battery 320 from overcharge, adjustment of the transfer power by the power receiving device 20 is required.

Despite the need for power control, no new communication is initiated between the supply device 5 and the power receiving device 20 in this state. This is because communication can compromise response and accuracy in power control due to its instability and latency. Therefore, the supply device 5 and the power receiving device 20 perform power transfer and control thereof based on known information up to this state.

The supply device 5 increases the transfer power of Magnetic Coupling check in response to the power request sent from the third communication device 340 by using the wide area wireless communication in advance. The supply device 5 keeps the current and voltage variations within its range and attempts to maximize the power transferred during the transition.

The power receiving device 20 basically receives the power transferred from the power transfer device 10 without any control. However, the power receiving device 20 starts the control when the transfer power exceeds or is exceeding the limit, such as the rated power of the battery 320 that varies according to the state of charge or the driving power demand of the vehicle 3. Power control in the vehicle ECU 330 is also required to cope with malfunctions in wide-area radio communication. This malfunction leads to a conflict between the power control target in the primary device 13 and the request from the third communication device 340, and a sudden failure of the power receiving device 20 and the battery 320 during the power transfer. The power receiving device 20 controls the power transferred under the power request rate notified by the first communication device 120.

The power requirements are determined based on Compatibility check information such as WPT circuitry topology, geometry, ground clearance, and EMC of the vehicles 3 and the primary device 13. The magnetic field differs according to these specifications, and power needs to be transferred to the extent that EMC is satisfied.

The power control and the power receiving device 20 in the power transfer ECU 110 may interfere with each other. In particular, there is a possibility of interference when the supply device 5 attempts to realize a power request that is larger than the latest power limit in the power receiving device 20 by wide area wireless communication. An example of this is rapid regeneration control with a relatively small battery 320 in the vehicle 3. If possible, it is desirable for the supply device 5 to be able to detect a mismatch between the power control target and the limit and to adjust the power transfer in order to eliminate the mismatch.

For example, when the power transfer is interrupted for a short period of time while the secondary device 22 is still on the primary device 13, such as when a foreign object on the primary device 13 is detected by the foreign object detection device 140 or when the magnetic coupling becomes low due to misalignment of the secondary device 22, the state transitions to Stand-by A160. When the foreign object detection device is provided in the vehicle 3, the foreign matter may be detected on the vehicle 3 side.

As the secondary device 22 passes over the primary device 13, the state transitions to Power transfer terminated A170. In this case, the magnetic coupling between the two devices is weakened, so that the power that is transferred is reduced. Since the supply device 5 can detect that the magnetic coupling is weakened by monitoring the transfer power, the supply device 5 basically determines the state transition to Power transfer terminated A170, and then starts to lower the voltage to stop the power transfer.

Stand-by A160 will be described. In this state, when the power transfer is interrupted for some reason for a short time and D-WPT is ready in both the vehicles 3 and the supply device 5, the state returns to Perform Power Transfer A150. If there is a possibility of interrupting the power transfer, the state becomes Stand-by A160.

Power transfer terminated A170 will be described. In this state, the supply device 5 reduces the transferred power to zero and holds or uploads power transfer result data such as total transferred power, power transfer efficiency, and failure history. Each piece of data is tagged with vehicle identification information. Lastly, the supply device 5 deletes the vehicle identity of the vehicle 3 that has passed the D-WPT lane. Thus, the supply device 5 can prepare for pairing and power transfer to other vehicles thereafter. FIG. 8 shows a process sequence of Power transfer terminated A170.

FIG. 8 is a sequence diagram showing an operation after the power supply during traveling from the supply device 5 to the vehicle 3 is completed.

When the power receiving device 20 of the vehicle 3 terminates the power receiving from the supply device 5 (S21), the vehicle 3 sends the power reception termination information to the server 30 (S22). In S22, the power reception termination information is sent from the third communication device 340 of the vehicle 3. The power reception end information includes, for example, vehicle identification information of the vehicle 3, received power from the supply device 5, power reception efficiency, and an abnormality detection result as information regarding power reception from the supply device 5.

When S21 process is performed, the supply device 5 terminates the power transfer to the vehicles 3 (S23). What is the handling of S21 and the handling of S23? It may or may not be performed simultaneously. When S23 is performed, the supply device 5 sends the power transfer termination information to the server 30 (S24). In S24, the power transfer termination information is sent from the first communication device 120 of the supply device 5.

Upon receiving the power reception end information from the vehicle 3 and receiving the power transfer termination information from the supply device 5, the server 30 performs a power supply termination process of terminating the power supply from the supply device 5 to the vehicle 3 (S25). In the power supply end process, a process of calculating the amount of electric power supplied from the supply device 5 to the vehicle 3 and a process of charging the user of the vehicle 3 based on the calculated amount of electric power supplied are performed on the basis of the power reception end information and the power transfer termination information.

In addition, the vehicle 3 sends the vehicle information to the server 30 regardless of the power supply termination process (S26). In S26, the vehicle information is sent from the third communication device 340 of the vehicle 3.

When receiving the vehicle information from the vehicle 3 after the power supply termination process is performed, the server 30 identifies the vehicle identification information of the vehicles 3 located in the neighborhood area of the respective supply devices 5 based on the vehicle information (S27).

Then, when the power supply end process for a certain vehicle 3 has been performed in a certain supply device 5, the server 30 deletes the vehicle identification information of the vehicle 3 for which the power supply end process has been performed from the vehicle identification information of the vehicle 3 in the vicinity area of the supply device 5 specified by S27 process (S28).

Thereafter, the server 30 sends, to the respective supply devices 5, the vehicle information associated with the vehicle identification information that has not been deleted in S28 process among the vehicle identification information of the vehicle 3 identified as being located in the neighborhood area of the respective supply devices 5 (S29).

After the vehicle information is sent to the respective supply devices 5 in S29 process, when the supply device 5 receives the vehicle information from the server 30, the supply device 5 registers and deletes the vehicle identification information in the identification information list (S30). S30 process is the same as the process of S14 of FIG. 7. After that, the supply device 5 sends the vehicle identification information registered in the identification information list to the server 30 (S31). S31 process is the same as the process of S15 of FIG. 7.

When receiving the vehicle identification information from the supply device 5, the server 30 sends a list registration notification to the vehicle 3 corresponding to the vehicle identification information registered in the identification information list (S32). S32 process is the same as the process of S16 of FIG. 7.

As a result, when the process shown in FIG. 8 is performed, the identification information list is located in the vicinity region of each of the supply devices 5, and the vehicle identification information is registered for the vehicle 3 in which the power supply from the supply device 5 has not been completed and a request for deletion of the vehicle identification information has not been made. When the vehicle identification information of the vehicle 3 is registered in the identification information list of any of the supply facilities 2, the vehicle 3 receives the list registration notification. Therefore, the vehicle ECU 330 can determine that the host vehicle is registered in any of the supply devices 5 by receiving the list-registration notification. When the vehicle 3 goes out of the vicinity of the supply device 5, the vehicle identification information of the vehicle 3 is deleted from the identification information list of the supply device 5.

Return to FIG. 6. In addition, in Power transfer terminated A170, the power receiving device 20 does not need to do anything in order to eliminate the transfer power. P2PS interface is kept active when the vehicles 3 are in D-WPT lanes, and the state of the power receiving device 20 automatically transitions to pairing for power transfer from the next primary device 13. Like the transition line shown in FIG. 6, the state transitions from Power transfer terminated A170 to Pairing and Alignment Check A130. As shown in FIG. 6, since the predetermined transition condition is satisfied, the transition from Magnetic Coupling Check A140 to Paring and Alignment check A130 can be made, and the transition from Perform Power Transfer A150 to Pairing and Alignment check A130 can be made. The pairing may be performed individually for the plurality of primary coils 11, or may be performed by bundling the plurality of primary coils 11 at a representative point.

Then, when there is no D-WPT request from the vehicle ECU 330 or when a series of states from Communication setup and Request D-WPT service A60 to Power transfer terminated A170 is prohibited, D-WPT service session A70 transitions to Terminate D-WPT service session A80 and stops the wide area radio communication between the first communication device 120 and the third communication device 340. For example, D-WPT is stopped when the state of charge of the battery 320 is too high or when the power receiving device 20 is too hot for continuous power transfer. Such unwanted D-WPT can be disabled by simply deactivating P2PS interface. However, by stopping the wide area wireless communication, the power transfer ECU 110 can release the memories occupied for the vehicles 3 without requiring D-WPT by terminating the established wide area wireless communication.

Further, D-WPT service session A70 is not limited to a transition such as a transition line illustrated in FIG. 6. In D-WPT service session A70, in the case where the power transfer process remains in D-WPT service session A70 when the activities after Pairing and Alignment check A130 are terminated, the process does not transition to Terminate D-WPT service session A80 but transitions to Compatibility check and Service authorization A110. For example, when a predetermined transition condition is met in the state of Magnetic Coupling Check A140, the state may transition to Compatibility check and Service authentication A110.

Another Example of Request A60

Figure 9:
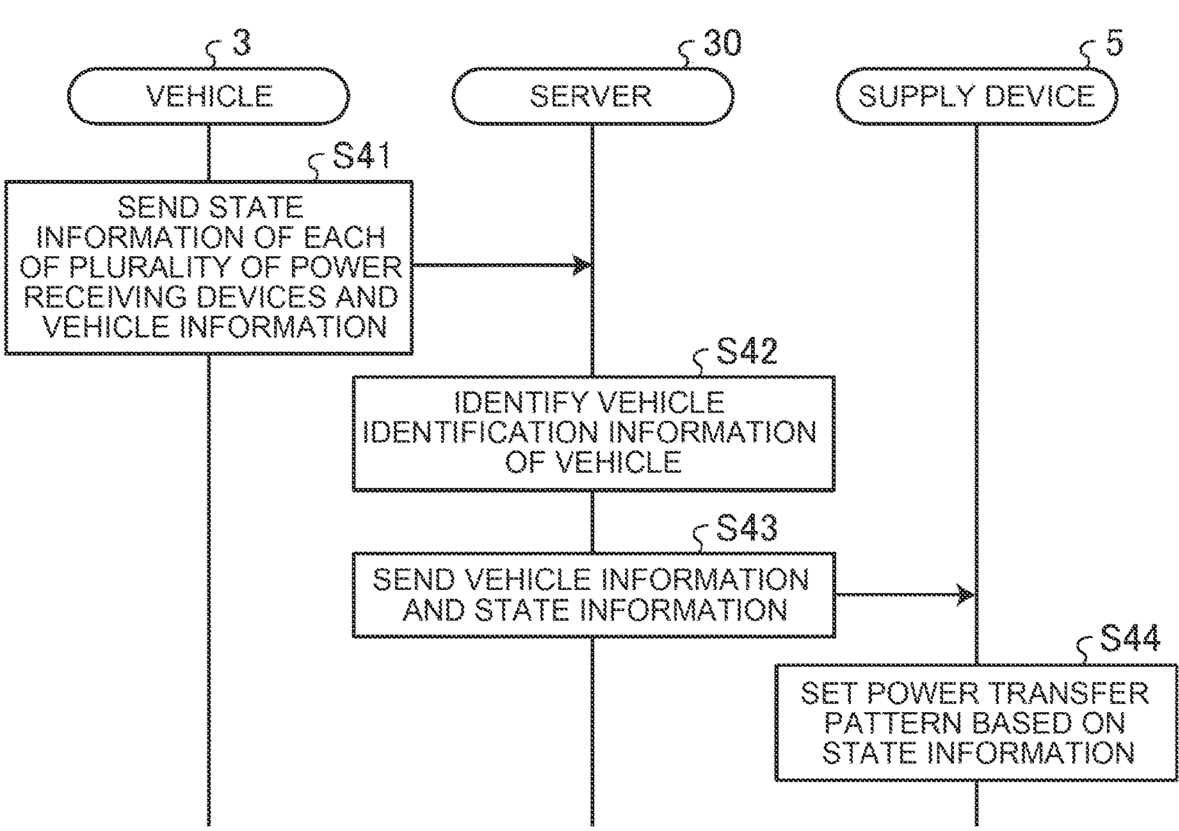
FIG. 9 is a sequence diagram illustrating a case where communication using wide area wireless communication is performed between a vehicle, a server, and a supply device.
Figure 10:
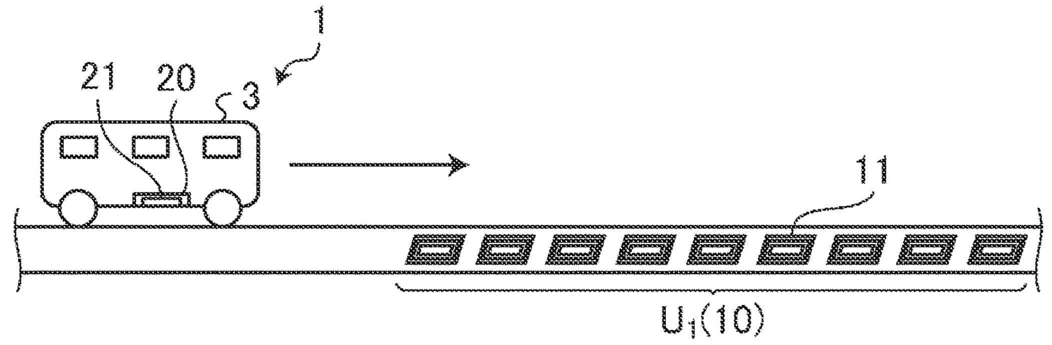
FIG. 10 is a diagram schematically illustrating a state performed before a vehicle enters a road of a supply facility.

Next, another exemplary Communication setup and Request D-WPT service A60 performed by the wireless power transfer system 1 prior to transitioning to D-WPT service session A70 will be described. FIG. 9 is a sequence diagram illustrating a case where communication using wide area wireless communication is performed between the vehicle 3, the server 30, and the supply device 5. FIG. 10 is a diagram schematically illustrating a state performed before the vehicle 3 enters the road 4 of the supply facility 2.

As shown in FIG. 9 and FIG. 10, the vehicle ECU 330 of the vehicle 3 sends the state information of each of the power receiving devices $\mathbf{20}_1$ to $\mathbf{20}_n$ and the vehicle information of the vehicle 3 to the server 30 through the third communication device 340 through the wide area radio communication before the vehicle 3 enters the road 4 of the supply facility 2 (S41). The state information includes identification information (ID information) identifying each of the power receiving devices $\mathbf{20}_1$ to $\mathbf{20}_n$, abnormality information indicating the presence or absence of an abnormality in each of the power receiving devices $\mathbf{20}_1$ to $\mathbf{20}_n$, position information indicating the positions of the power receiving devices $\mathbf{20}_1$ to $\mathbf{20}_n$ in the vehicle 3, coil information indicating the coil shapes of the secondary coils 21 in the power receiving devices $\mathbf{20}_1$ to $\mathbf{20}_n$, and coil type information indicating the coil types of the secondary coils 21 in the power receiving devices $\mathbf{20}_1$ to $\mathbf{20}_n$. For the state information, whether there is an abnormality is determined by the vehicle ECU 330 based on the currents, voltages, phase differences between current and voltage, etc. detected by sensors (not shown) of the power receiving devices $\mathbf{20}_1$ to $\mathbf{20}_n$, and the determination result is stored in a memory etc. Further, the abnormality information may store, in the memory, the presence or absence of an abnormality in the power receiving device 20 detected when the vehicle 3 enters the road 4 of other supply facility 2 and receives power, in association with the identification information of the power receiving device 20.

Subsequently, upon receiving the state information and the vehicle information from the vehicle 3, the server 30 identifies the vehicle identification information of the vehicle 3 located in the vicinity area of the supply device 5 based on the current position information of the vehicle 3 included in the vehicle information (S42). In S42, the server 30 identifies the vehicles 3 located in the predetermined neighborhood area from the supply device 5 based on the current position information of the vehicles 3 and the position information of the supply device 5. The neighborhood region is set to, for example, a region within 500 meters.

After that, when the vehicle identification information of the vehicle 3 is identified, the server 30 sends the vehicle information and the state information to the supply device 5 (S43). In S43, the transmitting device of the server 30 sends the vehicle information to the supply device 5.

Subsequently, the power transfer ECU 110 of the supply device 5 sets a power transfer pattern for transferring power to the vehicle 3 based on the state information received from the server 30 (S44). Specifically, the power transfer ECU 110 sets for each segment unit U1 a power transfer pattern of each of the plurality of segments 7 based on the state information. For example, the power transfer ECU 110 determines based on the state information whether the state of each of the power receiving devices $\mathbf{20}_1$ to $\mathbf{20}_n$ of the vehicle 3 is abnormal, and sets a power transfer pattern for stopping power transfer to the abnormal power receiving device 20. Thus, even when an abnormality occurs in part of the power receiving devices 20 of the vehicle 3, the supply device 5 can transfer power to the other power receiving devices 20 without stopping power transfer to the vehicle 3. Thereafter, the wireless power transfer system 1 transitions to D-WPT service session A70.

Example of Perform Power Transfer A150

Figure 12:
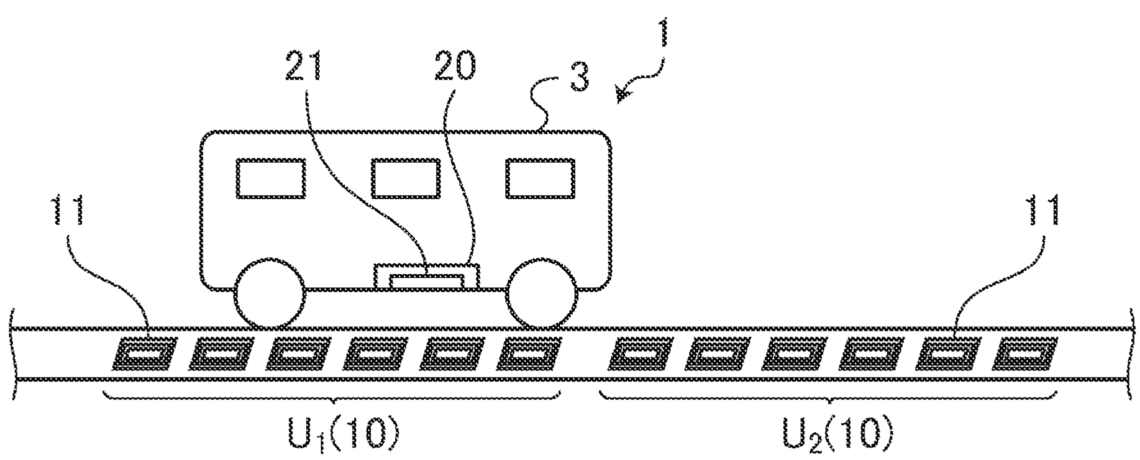
FIG. 12 is a diagram schematically illustrating a state in which a vehicle enters a next segment unit in a state in which the vehicle is traveling through a predetermined segment unit of a supply facility.

Next, an exemplary operation performed by the wireless power transfer system 1 in Perform Power Transfer A150 will be described. FIG. 11 is a sequential diagram illustrating an operation using P2PS between the vehicles 3 and the supply device 5 in Perform Power Transfer A150. FIG. 12 is a diagram schematically illustrating a state in which the vehicles 3 enter the subsequent segment unit U2 while traveling on a predetermined segment unit U1 of the supply facility 2.

As illustrated in FIG. 11, the vehicle ECU 330 determines whether or not there is a failed power receiving device 20 among the power receiving devices $\mathbf{20}_1$ to $\mathbf{20}_n$ (S51). Specifically, the vehicle ECU 330 determines, by performing a predetermined abnormality checking operation on each of the power receiving devices $\mathbf{20}_1$ to $\mathbf{20}_n$, that an abnormality has occurred in the power receiving device 20 in which, for example, a current value from an ammeter (not shown) or a voltage value from a voltmeter is less than a predetermined value. When it is determined that there is a power receiving device 20 in which an abnormality has occurred, among the power receiving devices $\mathbf{20}_1$ to $\mathbf{20}_n$ (S51: Yes), the vehicle ECU 330 switches the charging relay 310 corresponding to the abnormal power receiving device 20 to the open state (S52), and the process proceeds to S53. Thus, unnecessary charging of the vehicle 3A can be suppressed. On the other hand, when the vehicle ECU 330 determines that there is no power receiving device 20 in which an abnormality has occurred, among the power receiving devices $\mathbf{20}_1$ to $\mathbf{20}_n$ (S51: No), the process proceeds to S53.

Subsequently, the vehicle ECU 330 sends the state information of each of the power receiving devices $\mathbf{20}_1$ to $\mathbf{20}_n$ in the segment unit U1 to the supply device 5 via the fourth communication device 350 (S53).

The power transfer ECU 110 sets a power transfer pattern to be transferred by each of the segments 7 based on the state information received from the vehicle 3 (S54). For example, the power transfer ECU 110 determines based on the state information whether the state of each of the power receiving devices $\mathbf{20}_1$ to $\mathbf{20}_n$ in the vehicle 3 is abnormal, and sets a power transfer pattern for stopping power transfer to the abnormal power receiving device 20.

The power transfer ECU 110 transfers power from the segment unit U1 to the vehicle 3 based on the power transfer pattern (S55). Thus, it is possible to stop the power transfer to the abnormal power receiving device 20 in the vehicle 3.

The power transfer ECU 110 determines whether the vehicle 3 moves from the segment unit U1 currently traveling to the subsequent segment unit U2 based on the position information sent from the vehicle 3 by P2PS (S56). Specifically, as illustrated in FIG. 12, the power transfer ECU 110 determines whether the vehicle 3 moves from the segment unit U1 currently traveling to the subsequent segment unit U2 based on the position information sent from the vehicle 3 by P2PS. When it is determined by the power transfer ECU 110 that the vehicle 3 moves from the segment unit U1 currently traveling to the subsequent segment unit U2 (S56: Yes), the wireless power transfer system 1 shifts to S57. On the other hand, the power transfer ECU 110 repeats this determination process when it is determined by the power transfer ECU 110 that the vehicle 3 does not move from the segment unit U1 currently traveling to the subsequent segment unit U2 (S56: No).

In S57, the power transfer ECU 110 executes a passing process of passing the power transfer pattern of the segment unit U1 in which the vehicle 3 is currently traveling on to the segment unit U2 in which the vehicle 3 is going to travel next and performing power transfer.

Subsequently, the vehicle ECU 330 determines whether the abnormal power receiving device 20 has returned to normal (S58). Specifically, the vehicle ECU 330 performs a predetermined abnormality check operation on the abnormal power receiving device 20, and determines that the abnormal power receiving device 20 has returned to normal when, for example, its current value from an ammeter (not shown) or its voltage value from a voltmeter is equal to or greater than a predetermined value. Of course, in addition to the current value and the voltage value, the vehicle ECU 330 may determine that the abnormal power receiving device 20 has returned to normal when the magnetic coupling of the abnormal power receiving device 20 changes from the low state to the normal state. When the vehicle ECU 330 determines that the abnormal power receiving device 20 has returned to normal (S58: Yes), the vehicle 3 proceeds to S59. On the other hand, when the vehicle ECU 330 determines that the abnormal power receiving device 20 has not returned to normal (S58: No), the vehicle 3 proceeds to S63.

In S59, the vehicle ECU 330 switches the charging relay 310 corresponding to the power receiving device 20 that has returned to normal to the closed state.

Subsequently, the vehicle ECU 330 sends, via the fourth communication device 350, the return information indicating that the abnormal power receiving device 20 has returned to normal to the supply device 5 (S60).

Thereafter, the power transfer ECU 110 sets the power transfer pattern of the subsequent segment unit based on the return information received from the vehicle 3 (S61).

Subsequently, the power transfer ECU 110 transfers power to the subsequent segmented unit based on the power transfer pattern (S62).

In S63, the vehicle ECU 330 determines whether or not the vehicle 3 terminates the travel of the road 4 in the supply facility 2. When it is determined by the vehicle ECU 330 that the vehicle 3 ends the travel of the road 4 in the supply facility 2 (S63: Yes), the vehicle 3 ends this process. On the other hand, when it is determined by the vehicle ECU 330 that the vehicle 3 has not finished traveling on the road 4 in the supply facility 2 (S63: No), the vehicle 3 returns to S51.

According to the embodiment described above, the power transfer ECU 110 sets, for each power transfer device 10, the power transfer pattern transferred by each of the segments 7 based on the state information received from the vehicle 3 or the server 30, and power is transferred to each of the plurality of power transfer devices 10 based on the power transfer pattern, and therefore, it is possible to deal with even when an abnormality occurs in any one of the power receiving devices $\mathbf{20}_1$ to $\mathbf{20}_n$ of the vehicle 3.

According to the embodiment, the power transfer ECU 110 passes the power transfer pattern of the segment unit U1 in which the vehicle 3 is currently traveling on to the segment unit U2 in which the vehicle 3 is going to travel next, and causes the power transfer device 10 to transfer power. Therefore, it is possible to suppress the communication delay compared to the wide area radio communication.

Further, according to the embodiment, since the state information includes the identification information identifying each of the power receiving devices $\mathbf{20}_1$ to $\mathbf{20}_n$ and the abnormality information indicating the presence or absence of the abnormality of each of the power receiving devices $\mathbf{20}_1$ to $\mathbf{20}_n$, the supply device 5 can transfer the power in a power transfer pattern suitable for each of the states of the power receiving devices $\mathbf{20}_1$ to $\mathbf{20}_n$.

In addition, according to the embodiment, since the power transfer ECU 110 sets, in the segment unit U1, the power transfer pattern for stopping power transfer to the abnormal power receiving device 20. This can suppress unnecessary power transfer.

According to the embodiment, when the power transfer ECU 110 receives the return information from the vehicle 3, the power transfer pattern is changed based on the return information, and therefore, even when the vehicle 3 is traveling, appropriate power can be transferred.

According to the embodiment, when abnormal magnetic coupling occurs in any power receiving device 20 during magnetic coupling check on the power receiving devices $\mathbf{20}_1$ to $\mathbf{20}_n$ and the power transfer device 10, the power transfer ECU 110 sets, in the segment unit U in which the vehicle 3 is going to travel next, the power transfer pattern for stopping power transfer to the power receiving device 20 with abnormal magnetic coupling. Therefore, even when an abnormality occurs in part of the power receiving devices

20, power can be transferred to the other power receiving devices 20 without stopping the power transfer.

Further, in the wireless power transfer system according to the embodiment, the "power receiving device" can read "means," "circuit," or the like. For example, the power receiving device can be replaced with a power receiving unit or a power receiving circuit.

A program to be executed by the wireless power transfer system according to the embodiment is provided by being recorded in a computer-readable recording medium such as a CD-ROM, a flexible disk (FD), a CD-R, Digital Versatile Disk (DVD), a USB medium, or a flash memory in file data of an installable format or an executable format.

Note that, in the description of the flowchart in this specification, the relationship before and after the processing between the steps is explicitly indicated by expressions such as "first," "thereafter," and "subsequent," but the order of the processing necessary for carrying out the present embodiment is not uniquely determined by these expressions. That is, the order of the processes in the flowcharts described in this specification can be changed to the extent that there is no inconsistency.

Additional benefits and variations can be readily derived by one of ordinary skill in the art. The broader aspects of the disclosure are not limited to the specific details and representative embodiments presented and described above. Accordingly, various modifications may be made without departing from the spirit or scope of the general inventive concept as defined by the appended claims and their equivalents.

Although some of the embodiments of the present application have been described in detail with reference to the drawings, these are examples, and the present disclosure can be implemented in other forms in which various modifications and improvements are made based on the knowledge of a person skilled in the art, including the aspects described in the section of the disclosure of the present disclosure.

What is claimed is:

1. A wireless power transfer system comprising:
a vehicle; and
a supply device installed in a road and configured to contactlessly transfer power to the vehicle, wherein:
the vehicle includes
a plurality of power receiving devices configured to receive power from the supply device, and
a communication device configured to send state information indicating states of the power receiving devices to the supply device;
the supply device includes
a plurality of power transfer devices including a first power transfer device and a second power transfer device, the first power transfer device including a first segment unit, the second power transfer device including a second segment unit, each of the first segment unit and the second segment unit including a plurality of segments configured to transfer power, and
a processor
configured to
receive the state information,
set, based on the received state information, a power transfer pattern by which each of the segments transfers power, the power transfer pattern being set for each of the power transfer devices, and
cause each of the power transfer devices to transfer power based on the power transfer pattern;
the state information includes
identification information identifying each of the power receiving devices, and
abnormality information indicating presence or absence of an abnormality in each of the power receiving devices;
the processor is further configured to
determine, based on the state information, whether the state of each of the power receiving devices is abnormal,
set, in response to a determination that an abnormality has occurred, the power transfer pattern for stopping power transfer to the power receiving device with the abnormality,
determine whether the vehicle moves from the first segment unit that the vehicle is currently traveling on to the second segment unit that the vehicle is going to travel next,
pass, in response to a determination that the vehicle moves from the first segment unit to the second segment unit, the power transfer pattern of the first segment unit to the second segment unit, and
cause the power transfer device to transfer power;
the communication device of the vehicle is configured to, in a case where the abnormality occurs in any of the power receiving devices, send return information to the supply device after the power receiving device with the abnormality has returned to normal, the return information indicating that the power receiving device with the abnormality has returned to normal;
the processor is further configured to change the power transfer pattern based on the return information; and
the processor is further configured to, in a case where abnormal magnetic coupling occurs in any of the power receiving devices during a magnetic coupling check on the power receiving devices and the power transfer devices, set, in the second segment unit, the power transfer pattern for stopping power transfer to the power receiving device with the abnormal magnetic coupling.

2. A wireless power transfer system comprising:
a vehicle; and
a supply device installed in a road and configured to contactlessly transfer power to the vehicle, wherein:
the vehicle includes:
a plurality of power receiving devices configured to receive power from the supply device, and
a communication device configured to send state information indicating states of the power receiving devices to the supply device;
the supply device includes:
a plurality of power transfer devices including a first power transfer device and a second power transfer device, the first power transfer device including a first segment unit, the second power transfer device including a second segment unit, each of the first segment unit and the second segment unit including a plurality of segments configured to transfer power; and
a processor configured to:
cause each of the power transfer devices to transfer power based on a current power transfer pattern, the current transfer pattern having been set based on prior state information;
receive a current state information;
set, based on the current state information, a next power transfer pattern by which a next segment unit is to transfers power, the next power transfer pattern being set based on the current state information, the next segment unit being the second segment unit that the processor determined the vehicle will travel to next; and cause the power transfer devices to transfer power based on the next power transfer pattern;

the state information includes:

identification information identifying each of the power receiving devices; and magnetic coupling abnormality information indicating presence or absence of a magnetic coupling abnormality in each of the power receiving devices; and the processor is further configured to, in a case where the current state information indicates the magnetic coupling abnormality for one or more of the power receiving devices set the next power transfer pattern for stopping power transfer to the power receiving device indicated as having the magnetic coupling abnormality;

pass, in response to a determination that the vehicle moves from the first segment unit to the second segment unit, the power transfer pattern of the first segment unit to the second segment unit, and cause the power transfer device to transfer power:

the communication device of the vehicle is configured to, in a case where the abnormality occurs in any of the power receiving devices, send return information to the supply device after the power receiving device with the abnormality has returned to normal, the return information indicating that the power receiving device with the abnormality has returned to normal;

the processor is further configured to change the power transfer pattern based on the return information; and stop the power transfer devices from transferring power based on the magnetic coupling abnormality information included in the current state information.

* * * * *